(12) United States Patent
Huang et al.

(10) Patent No.: US 8,848,583 B2
(45) Date of Patent: Sep. 30, 2014

(54) COMMUNICATION METHOD AND APPARATUS FOR HEADER COMPRESSION

(75) Inventors: Gang Huang, Shanghai (CN); Wenliang Liang, Shanghai (CN); Lei Lu, Shanghai (CN); Haihua Shen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 364 days.

(21) Appl. No.: 13/277,606

(22) Filed: Oct. 20, 2011

(65) Prior Publication Data

US 2012/0106413 A1 May 3, 2012

Related U.S. Application Data

(63) Continuation of application No. PCT/CN2009/074637, filed on Oct. 27, 2009.

(30) Foreign Application Priority Data

Apr. 20, 2009 (WO) ................ PCT/CN2009/071368

(51) Int. Cl.
| | |
|---|---|
| *H04B 7/00* | (2006.01) |
| *H04L 29/06* | (2006.01) |
| *H04L 1/16* | (2006.01) |
| *H04L 1/00* | (2006.01) |
| *H04L 1/18* | (2006.01) |

(52) U.S. Cl.
CPC ............. *H04L 5/1435* (2013.01); *H04L 69/22* (2013.01); *H04L 1/1671* (2013.01); *H04L 1/1614* (2013.01); *H04L 1/1812* (2013.01); *H04L 1/0079* (2013.01); *H04L 69/04* (2013.01)
USPC ......................................................... 370/310

(58) Field of Classification Search
CPC ..... H04W 84/18; H04W 84/12; H04W 80/04; H04W 36/30; H04L 12/56; H04L 29/0653; H04L 2112/5652
USPC .......... 370/310, 389, 392, 471, 349, 333, 351, 370/394, 474, 395.52; 704/270.1
See application file for complete search history.

(56) References Cited

U.S. PATENT DOCUMENTS

| | | | | |
|---|---|---|---|---|
| 7,327,734 | B2 * | 2/2008 | Yi et al. | ........................ 370/394 |
| 8,416,678 | B2 * | 4/2013 | Yi et al. | ........................ 370/216 |

(Continued)

FOREIGN PATENT DOCUMENTS

| | | |
|---|---|---|
| CN | 1913534 A | 2/2007 |
| CN | 1996941 A | 7/2007 |

(Continued)

OTHER PUBLICATIONS

EPO Extended European Search Report dated Jul. 6, 2012, issued in related European Application No. 09843571.2, Huawei Technologies Co., Ltd. (10 pages).

(Continued)

*Primary Examiner* — Chi Pham
*Assistant Examiner* — Alexander O Boakye
(74) *Attorney, Agent, or Firm* — Slater & Matsil, L.L.P.

(57) ABSTRACT

A communication method and a related apparatus for header compression by using an automatic retransmission mechanism are disclosed. The method comprises determining with a receive end parameters required for performing header compression and an ARQ through negotiation, constructing a lower-layer PDU that comprises header compression information, and sending the PDU to a receive end. By using methods provided in the embodiments of the present invention, combination of a header compression mechanism and an ARQ mechanism may be implemented, thereby improving header compression efficiency and accuracy, and saving air interface resources.

46 Claims, 12 Drawing Sheets

(56) References Cited

U.S. PATENT DOCUMENTS

2003/0179713 A1    9/2003   Fleming
2008/0080559 A1    4/2008   Singh

FOREIGN PATENT DOCUMENTS

| | | |
|---|---|---|
| CN | 101179564 | 5/2008 |
| CN | 101179564 A | 5/2008 |
| CN | 101204068 A | 6/2008 |
| CN | 101379734 A | 3/2009 |
| EP | 1873955 A2 | 1/2008 |
| WO | WO 2007/031090 A1 | 3/2007 |
| WO | WO 2007/131880 A1 | 11/2007 |
| WO | WO 2008/051126 | 5/2008 |

OTHER PUBLICATIONS

Kandukuri, Sunil, et al., "Impact of TCP and RLP Parameters on CDMA2000 Performance", VTC 2003-Spring, The 57$^{th}$ IEEE Semi-annual Vehicular Technology Conference Proceedings, Apr. 22-25, 2003 (6 pages).

Written Opinion of the International Searching Authority related to Int'l Application No. PCT/CN2009/071368; filed Apr. 20, 2009, mailed Jan. 28, 2010 for Huawei Tech Co. Ltd. (7 pgs.).

International Search Report related to Int'l Application No. PCT/CN2009/071368; filed Apr. 20, 2009, mailed Jan. 28, 2010 for Huawei Tech Co. Ltd. (5 pgs.).

Written Opinion of the International Searching Authority related to Int'l Application No. PCT/CN2009/074637; filed Oct. 27, 2009, mailed Jan. 28, 2010 for Huawei Tech Co. Ltd., et al. (7 pgs.).

International Search Report related to Int'l Application No. PCT/CN2009/074637; filed Oct. 27, 2009, mailed Jan. 28, 2010 for Huawei Tech Co. Ltd., et al. (4 pgs.).

Suryavanshi et al.; "A Hybrid ARQ Scheme for Resilient Packet Header Compression"; Global Telecommunications Conference, Globecom '04, IEEE, vol. 3, pp. 1635-1639, Nov. 29-Dec. 3, 2004 (5 pgs.).

Bormann et al.; Robust Header Compression (ROHC): Framework and four profiles: RTP, UDP, ESP, and uncompressed; Network Working Group; Request for Comments: 3095; Category: Standards Track; Jul. 2001 (168 pgs.).

Part 16: Air Interface for Broadband Wireless Access Systems; DRAFT Standard for Local and metropolitan area networks; P802.16Rev2/D9 Jan. 2009; IEEE Standards draft (2098 pgs.).

Part 16: Air Interface for Fixed and Mobile Broadband Wireless Access Systems; Multihop Relay Specification; Draft Amendment to IEEE Standard for Local and Metropolitan Area Networks; May 30, 2008; IEEE P802. 16j/D5 (317 pgs.).

3GPP TS 36.323 V8.5.0 Mar. 2009; Technical Specification; 3$^{rd}$ Generation Partnership Project; Technical Specification Group Radio Access Network; Evolved Universal Terrestrial Radio Access (E-UTRA); Packet Data Convergence Protocol (PDCP) specification (Release 8) (24 pgs.).

First Office Action of Chinese Application No. 200980121735.7 mailed Apr. 2, 2013, 11 pages. (Partial Translation).

\* cited by examiner

| General media access control header (GMACH) | Other sub-header | Fragment sub-header (FSH)/packing sub-header (PSH) | Payload | Cyclic redundancy check (CRC) |

COMMUNICATION METHOD AND APPARATUS FOR HEADER COMPRESSION

CROSS-REFERENCE TO RELATED APPLICATIONS

This application is a continuation of International Application No PCT/CN2009/074637, filed on Oct. 27, 2009, which claims priority to International Application No. PCT/CN2009/071368, filed on Apr. 20, 2009, both of which are hereby incorporated by reference in their entireties.

FIELD OF THE INVENTION

The present invention relates to a wireless communications field, and in particular, to a communication method and an apparatus for header compression.

BACKGROUND OF THE INVENTION

Compared with a wired link, a wireless link has a poorer and less stable transmission environment. As a result, a transmission rate of the wireless link is low, and a bit error rate of the wireless link is high. As such, the modern wireless communications industry has been trying to find a solution that provides a high transmission rate and a low bit error rate against inherent features of the wireless link to reduce unfavorable impact of the wireless link on communication. One solution combines a Hybrid Auto-Repeat reQuest (HARQ) technology and a Robust Header Compression (ROHC) technology.

An HARQ is a request retransmission technology that introduces Forward Error Correction (FEC) to an Auto-Repeat reQuest (ARQ). A basic processing principle is as follows: If a transmission error is within a correction scope of the FEC, forward error correction is implemented; if the transmission error is beyond the correction scope of the FEC, a receive party requests for retransmission. ROHC is a flow-based Header Compression (HC) scheme that can compress headers with overlarge overhead in some data packets (for example, IPv6 packets) to reduce data transmission volume and improve bandwidth usage rate. In a wireless communication system, a unidirectional ROHC channel (a logical channel) and an ROHC feedback channel (FCH) can be established by using an ROHC mechanism. An ingress of the unidirectional ROHC channel is a compressor, and an egress of the unidirectional ROHC channel is a decompressor. The ROHC FCH is a logical channel that carries feedback information. An ingress of the ROHC FCH is a decompressor, and an egress of the ROHC FCH is a compressor. The compressors and decompressors of the two channels exist in pairs. After compressing a packet header of original data, a compressor sends the packet header to a decompressor through the ROHC channel. The decompressor of the ROHC FCH sends feedback information through the ROHC FCH to the compressor of the ROHC FCH.

In a word, header compression of the ROHC mechanism can be described as interaction between two state machines (a compression state machine and a decompression state machine). Each state machine has three different states. Both state machines gradually change from the lowest compression state to a higher state. The ROHC compression state machine includes three states: Initial and Refresh (IR), First Order (FO), and Second Order (SO) compression states. The ROHC decompression state machine includes three states: No Context (NC) decompression state, Static Context (SC) decompression state, and Full Context (FC) decompression state. For a compression state machine in the IR compression state, the decompressor barely has SC and Dynamic Context (DC) information required for decompression. The ROHC compressor sends an IR or IR-DYM data packet. The IR packet may include both SC information and DC information, while the IR-DYM packet can include only DC information. When the compressor receives SC information and a part of DC information, the compression state machine is in the FO compression state. When the decompressor receives all SC information and DC information, the compression state machine enters into the SO compression state, and the packet header of the original data is compressed to a maximum size. The NC decompression state is an initial state of a decompressor, indicating that the decompressor does not receive a data packet, and does not have any information required for decompression. The SC decompression state indicates that the decompressor obtains all static decompression information and a part of dynamic decompression information. The FC decompression state indicates that he decompressor obtains all decompression information.

Context information of the ROHC is classified into two different types: SC information and DC information. The SC information barely changes. Therefore, the compressor does not need to transmit SC information after a receive end correctly receives the information. The DC information changes. The DC information in an existing IP data packet header is mainly a serial number, a timestamp, and an IP identifier. These three parameters change according to a certain rule. The existing RFC 3095 defines specific compression methods for these three parameters in detail. The most important compression methods are Least Significant Bits (LSB) coding and Window-based LSB (W-LSB) coding. The W-LSB algorithm is an improvement on the LSB algorithm, and is an LSB coding algorithm based on a sliding window. During encoding of the W-LSB algorithm, a scope of the sliding window includes a group of reference base values. The decompressor can correctly decompress an encoded value after receiving any base value in the sliding window. After the W-LSB coding is used, the compressor will not lose synchronization with the decompressor unless all base values in the sliding window are lost.

For the W-LSB coding scheme, a Sliding Window Width (SWW) is an important parameter for evaluating robustness and a compression rate of the W-LSB coding. If the sliding window is too narrow, when a small number of packets are lost on a wireless channel, a data packet that is subsequently transmitted to the decompressor cannot be successfully decompressed. If the sliding window is too wide, the number of bits used to encode LSBs in each compression domain increases, lowering an efficiency of header compression.

According to the preceding research on the prior art, the inventor finds that: If a data packet that includes an update of the SC information has an error or is lost, all subsequent data packets cannot obtain the SC information, leading to a failure in decompressing a large number of subsequent data packets; if the number of continuously lost data packets is larger than W-LSB SWW, the DC information in the subsequent data packets cannot be parsed, leading to a decompression failure. In the existing ROHC mechanism, an incorrect packet header is directly dropped without further processing. Therefore, when the preceding scenarios occur, state rollback is triggered, context information is updated, and the decompression state is re-synchronized only when an error data packet ratio reaches a certain extent. Especially when the wireless link is in a poor condition, frequent state rollbacks occur, greatly lowering compression efficiency.

After a further research on the prior art, the inventor finds that the following problems occur when the ROHC mechanism and the ARQ mechanism (including the HARQ mechanism) are combined:

1. A retransmission mechanism of the ARQ leads to a disorder of data packets. The ARQ uses the retransmission mechanism to improve data transmission quality. As a result, a data packet whose Block Sequence Number (BSN) is small arrives later than a data packet whose BSN is large. In addition, the ROHC mechanism has only an anti-disorder capability to some extent. Once a disorder degree of data packets exceeds a capacity of the ROHC sliding window, an ROHC layer cannot correctly decompress a data packet even if the data packet can be correctly received, thereby wasting system resources.

2. The retransmission mechanism of the ARQ may make an ROHC receive end unable to send feedback information to an ROHC transmit end in a timely manner. Each sub-packet sent by the HARQ includes a large number of Service Data Units (SDUs). The receive end needs to receive and decompress an entire sub-packet before performing feedback to the transmit end. In this case, feedback delay of an ROHC data packet that is compressed early in the sub-packet is long. The ARQ uses a sliding window mechanism. The sliding window buffers a large number of SDUs. An SDU is transmitted to the decompressor at the ROHC layer only when the SDU is correctly received, thereby increasing the feedback delay of the ROHC data packet.

3. Assume that the HARQ mechanism is multi-process, and ROHC data packets with a same context identifier (ID) are encapsulated into different HARQ processes. Once the context information of the compressor and decompressor at the ROHC layer is not synchronized, the context information currently received by the decompressor at the ROHC layer does not corresponds to a currently received data packet. In this case, if the decompressor at the ROHC layer still uses the currently received context information to decompress the currently received data packet, decompression evidently fails.

SUMMARY OF THE INVENTION

Embodiments of the present invention provides a communication method and an apparatus for header compression to solve problems of a failure in combining a packet header compression mechanism with an ARQ technology, and a data packet disorder and loss of synchronization of context information after the packet header compression mechanism is combined with the ARQ technology.

A communication method for header compression by using an ARQ, mechanism includes: determining, by a transmit end and a receive end, parameters required for performing header compression and an ARQ through negotiation; constructing, by a lower-layer protocol data unit (PDU) constructing entity of the transmit end, a lower-layer PDU that includes header compression information and sending the lower-layer PDU to the receive end; and interacting with the receive end to perform header compression processing.

A communication method for header compression by using an ARQ mechanism includes: determining, with a transmit end, parameters required for performing header compression and an ARQ through negotiation; receiving a lower-layer PDU that includes header compression information; and interacting with the transmit end to perform packet header decompression.

A method for constructing a protocol data processing unit includes: encapsulating, by a PDU constructing entity, an SDU into a PDU; and adding an extended sub-header to the PDU, where the extended sub-header includes header compression information.

A method for processing a header compression communication error by using an ARQ mechanism includes: performing a cyclic redundancy check (CRC) on a received PDU; splitting a PDU that fails the check into SDUs, sending the SDUs to a header compression layer, and notifying the header compression layer that the SDUs are error data packets; and updating related context information based on correct header information that is obtained through header decompression if the header compression layer can decompress a header of an SDU that is split from the lower-layer PDU and the SDU passes the CRC performed by the header compression layer.

A method of combining header compression feedback and ARQ feedback includes: notifying, by a decompressor at a header compression layer of a receive end, an ARQ layer at the receive end of a data decompression error, and instructing a transmit end to perform retransmission by using a feedback mechanism of an ARQ when the decompressor at the header compression layer of the receive end receives an SDU whose header is compressed and that is transmitted by the ARQ layer of the receive end, and the SDU still fails a CRC after packet header decompression is performed.

A method for encapsulating a sub-packet in an HARQ when a header compression mechanism is combined includes: after receiving an SDU sent by a header compression layer, encapsulating, by a Media Access Control (MAC) layer, the SDU into a PDU, and sending the PDU to an HARQ layer; and encapsulating, by the HARQ layer, the PDU into a sub-packet, where a first SDU in a first PDU with each context ID in the encapsulated sub-packet is an initialization and state information update packet.

An apparatus for header compression by using an ARQ mechanism includes: a sending module and a receiving module, where the sending module is configured to determine parameters required for performing header compression and an ARQ with the receiving module through negotiation, construct a lower-layer PDU that includes header compression information and send the PDU to the receiving module, and interact with the receiving module to perform header compression processing, and the receiving module is configured to determine the parameters required for performing the header compression and the ARQ with the sending module through negotiation, receive the lower-layer PDU that is sent by the sending module and includes header compression information, and interact with the sending module to perform header compression communication.

An apparatus for constructing a PDU includes: a header compression information obtaining module and a header compression information adding module, where the header compression information obtaining module is configured to obtain header compression information from an SDU whose header is compressed and send the information to the header compression information adding module, and the header compression information adding module is configured to add an extended sub-header to a PDU, and add the header compression information to the extended sub-header.

An apparatus for processing a header compression error by using an automatic retransmission mechanism includes: a first checking unit, a splitting unit, a second checking unit, and an updating unit; where: the first checking unit is configured to perform a CRC on a received PDU; the splitting unit is configured to split a PDU that fails the check into SDUs, send the SDUs to a header compression layer, and notify the header compression layer that the SDUs may be incorrect; the second checking unit is configured to determine whether a packet header of an SDU can be decompressed and whether the SDU passes the CRC performed by the header compression layer; and the updating unit is configured to update related context information based on correct header information that is obtained through packet header decompression when the second checking unit confirms that the packet header of the SDU can be decompressed and the SDU passes the CRC performed by the header compression layer.

An apparatus for encapsulating a sub-packet in an HARQ when a header compression mechanism is combined includes: a negotiating unit, a counting unit, and an encapsulating unit, where: the negotiating unit is configured to determine the number N of PDUs encapsulated in a sub-packet of each HARQ through negotiation before a header compression layer performs compression, where N that is determined through negotiation is a number supported by an HARQ layer, a MAC layer, and the header compression layer; the counting unit is configured to record the number of PDUs that are sent by the MAC layer to the HARQ layer, where when the number reaches N, the counting unit is reset and instructs a compressor at the header compression layer that corresponds to each context ID on a connection corresponding to an HARQ channel to roll back a state; and the encapsulating unit is configured to start to encapsulate an HARQ sub-packet at the HARQ layer after the MAC layer receives an SDU that belongs to an initialization and state information update packet, where a first SDU in a first PDU with each context ID encapsulated by each sub-packet is an initialization and state information update packet.

A method for data packet compression based on an HARQ includes: receiving, by an HARQ layer of a transmit end, a data packet sent from a header compression layer, where the data packet of the header compression layer includes at least context information of the data packet of the header compression layer; encapsulating the data packet of the header compression layer for the data packet to construct an HARQ-layer data packet; and identifying the HARQ-layer data packet to instruct a receive end to save the context information of the data packet of the header compression layer.

A method for data packet decompression based on a multi-process HARQ includes: receiving, by a header compression layer of a receive end, a data packet and a related packet number from an HARQ layer at the local end, and marking the packet number of the received HARQ-layer data packet as Pn; querying a list maintained at the local end to obtain context information of a data packet of the header compression layer, where the data packet corresponds to a packet number that is the smallest and most approximate to Pn in the list; and decompressing the received HARQ-layer data packet by using the context information of the data packet of the header compression layer, where the data packet corresponds to the packet number that is the smallest and most approximate to Pn in the list.

An apparatus for data packet compression based on a multi-process HARQ includes: a receiving unit, configured to receive a data packet sent from a header compression layer, where the data packet includes at least context information of the data packet of the header compression layer; an encapsulating unit, configured to encapsulate the data packet of the header compression layer for the data packet to construct an HARQ-layer data packet; and an identifying unit, configured to identify the HARQ-layer data packet to instruct a receive end to save the context information of the data packet of the header compression layer.

An apparatus for packet decompression based on an HARQ includes: a receiving unit, configured to receive a data packet and a related packet number from an HARQ layer of a receive end, and mark the packet number of the received HARQ-layer data packet as Pn; an obtaining unit, configured to query a list maintained at the local end to obtain context information of a data packet of a header compression layer, where the data packet corresponds to a packet number that is the smallest and most approximate to Pn in the list; and a decompressing unit, configured to decompress the received HARQ-layer data packet by using the context information of the data packet of the header compression layer, where the data packet corresponds to the packet number that is the smallest and most approximate to Pn in the list.

In addition, a computer program product is provided. The computer program product includes a computer program code, where, when the computer program code is executed by a computer, the computer program code allows the computer to perform steps in one or all of the preceding methods.

In addition, a computer readable storage medium is provided. The computer readable storage medium stores a computer program code, where, when the computer program code is executed by a computer, the computer program code allows the computer to perform steps in one or all the preceding methods.

The methods and apparatuses in embodiments of the present invention improve the efficiency and accuracy of header compression, and save air interface resources by combining the ARQ (including the HARQ) mechanism and the header compression technology and through processing of some technical issues thereby brought.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following descriptions merely show some embodiments of the present invention. Those skilled in the art can obtain other accompanying drawings based on these accompanying drawings without creative efforts.

DETAILED DESCRIPTION OF THE EMBODIMENTS

The following clearly and fully describes the technical solutions in the embodiments of the present invention with reference to the accompanying drawings. Evidently, the embodiments described below are only some embodiments rather than all embodiment of the present invention. All other embodiments obtained by those skilled in the art without creative efforts based on the embodiments of the present invention also fall within the protection scope of the present invention.

The embodiments of the present invention take that a header compression mechanism is an ROHC mechanism for example. It can be understood to those skilled in the art that the implementation modes in the methods or apparatuses in the embodiments of the present invention are not confined to the ROHC mechanism, but can use, for example, a real-time transmission protocol header compression mechanism or an extended real-time transmission protocol header compression mechanism.

In addition, the embodiments of the present invention take a PDU at a MAC protocol layer for example. It can be understood to those skilled in the art that the implementation modes in the methods or apparatuses in the embodiments of the present invention are not confined to the MAC-layer PDU, but can use a PDU of another lower-layer protocol, such as a PDU at a Radio Link Control (RLC) layer in a Long Term Evolution (LTE) system.

Embodiment 1

Figures 1, 2:
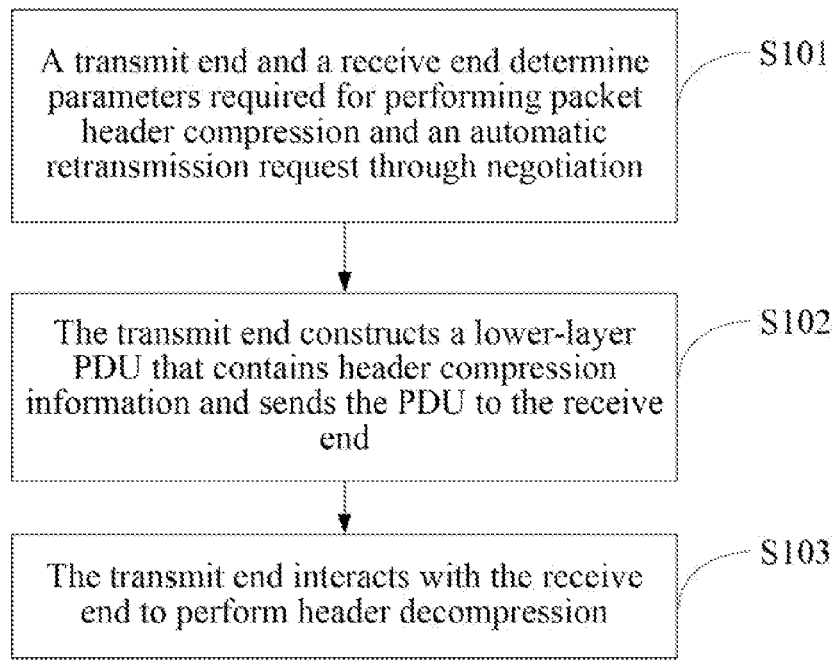
FIG. 1 is a flowchart of a method according to a first embodiment of the present invention.
FIG. 2 is a schematic diagram of a basic format of a MAC-layer PDU in the prior art.

FIG. 1 is a flowchart of a method according to an embodiment of the present invention.

S101: A transmit end and a receive end determine parameters required for performing header compression and an ARQ through negotiation.

Before the two ends perform parameter negotiation, an ROHC layer and an ARQ layer at each end need to negotiate with each other to confirm related information. Specifically, a network needs to request the ARQ layer and ROHC layer to perform necessary parameter negotiation according to a current actual condition, such as support capabilities of the ROHC layer and ARQ layer, when a connection is established. The negotiation content includes Whether the connection uses an ARQ mechanism and an ROHC mechanism. If the connection uses the ARQ mechanism and the ROHC mechanism, information such as whether the ARQ uses a buffer mechanism and a buffer window size needs to be notified to the ROHC layer. The ROHC layer determines a related working mode and a compression algorithm based on the preceding parameters and a service type of the connection, and sends the compression algorithm that is used by the ROHC layer and the parameters to the ARQ layer. The ARQ layer uses a working mechanism that matches that of the ROHC layer.

After the transmit end and the receive end confirm that the connection uses the ARQ mechanism and the ROHC mechanism through negotiation, the transmit end and the receive end also need to negotiate whether related parameters at both ends match. If related parameters at both ends match, a transmission method that combines the ARQ mechanism and the ROHC mechanism is used; If related parameters at both ends do not match, a method that combines the ARQ mechanism and ROHC mechanism still cannot be used.

S102: The transmit end constructs a lower-layer PDU that includes header compression information and sends the PDU to the receive end.

After receiving an SDU on which ROHC is performed from an upper layer (that is, the ROHC layer), a MAC-layer PDU constructing entity packs and/or fragments the SDU and encapsulates the SDU into a MAC-layer PDU that is suitable for network transmission according to an actual network condition. In this embodiment of the present invention, the transmit end constructs the MAC-layer PDU that includes ROHC information and sends the MAC-layer PDU to the receive end, which saves network transmission volume and facilitate header decompression at the receive end. The ROHC information may include a context ID in an SDU header, information about whether an error data packet includes a context update, and so on.

S103: The transmit end interacts with the receive end to perform header decompression processing.

In an actual implementation procedure, an ROHC communication method that uses an ARQ mechanism in this embodiment of the present invention may include a processing mechanism for a scenario when an error data packet or packet loss occurs during transmission and a specific implementation method for combining ROHC feedback and ARQ feedback. The MAC-layer PDU and an SDU that is included in the MAC-layer PDU include ROHC information. Therefore, ROHC may be implemented more correctly and more efficiently when the processing mechanism for the scenario when an error data packet or packet loss occurs during transmission and the mechanism for combining ROHC feedback and ARQ feedback are implemented.

In this embodiment of the present invention, combination of an ROHC mechanism and an ARQ mechanism may be implemented, which improves the header compression efficiency and accuracy, and saves air interface resources.

The following describes the specific method in this embodiment of the present invention with the accompanying drawings in detail:

Embodiment 2

For S101 in the first embodiment in which the transmit end negotiates with the receive end to determine the parameters required for performing the header compression and the ARQ, the second embodiment of the present invention provides a specific negotiation method. The method is as follows:

S1: The receive end and the transmit end determine a new connection that needs to be established.

S2: Determine whether the connection supports ROHC and an ARQ based on an actual condition of a current network and a capability of the network.

S3: If the connection does not support the ROHC and the ARQ, do not use a method that combines the ROHC and the ARQ to transmit data; if the connection supports the ROHC and the ARQ, notify related parameters of the ARQ to the ROHC layer.

S4: The ROHC layer adjusts some parameters of the ROHC layer, such as a compression algorithm and a compression window size, according to the ARQ parameters.

S5: After adjusting the parameters of the ROHC layer, the ROHC layer notifies the parameters to the ARQ layer.

S6: The transmit end and the receive end perform negotiation on connection establishment, where the negotiation content includes the parameters required for performing the header compression and the ARQ.

S7: If the parameters that are required for performing the header compression and the ARQ and are negotiated by both ends do not match: if one end can modify parameters to achieve parameter matching, instruct the end to modify the parameters; if parameters at both ends cannot be modified, do not use a method that combines the ROHC and the ARQ. If the parameters at both ends may match, use the method that combines the ROHC and the ARQ to transmit data.

By using the method provided in the second embodiment of the present invention, efficient negotiation on parameters between the ROHC layer and the ARQ layer and efficient negotiation on parameters at the transmit end and the receive end may be implemented.

Embodiment 3

After the transmit end and receive end determine related parameters at the ROHC layer and the ARQ layer through negotiation, the third embodiment of the present invention describes a method for constructing, by the transmit end, a MAC-layer PDU that includes the ROHC information and sending the PDU to the receive end.

After receiving an SDU on which ROHC is performed from the upper layer (that is, the ROHC layer), the MAC-layer PDU constructing entity packs or fragments the SDU and encapsulates the SDU into a MAC-layer PDU that is suitable for network transmission according to an actual network condition. FIG. 2 shows a basic format of a MAC-layer PDU.

In the prior art, the MAC-layer PDU does not parse ROHC-related information in the SDU header. In this embodiment of the present invention, an extended sub-header is added to the MAC-layer PDU, and the ROHC-related information is included in the extended sub-header. By including some ROHC information in the MAC-layer PDU, data volume in transmission may be saved, or header decompression at the receive end is facilitated.

Specifically, the following two specific implementation methods may be included:

1. The MAC-layer PDU constructing entity packs and fragments SDUs that have the same context ID, that is, encapsulates SDUs that have the same context ID into a MAC-layer PDU, adds the context ID to the extended sub-header of the MAC-layer PDU that includes SDU headers, and removes the context ID from the SDU headers.

It can be understood to those skilled in the art that the preceding extended sub-header needs to be added to indicate the context ID only when an SDU that form the MAC-layer PDU include a header. For example, if an SDU is fragmented into two MAC-layer PDUs, the second MAC-layer PDU does not need the extended sub-header to include the context ID.

Figure 3:
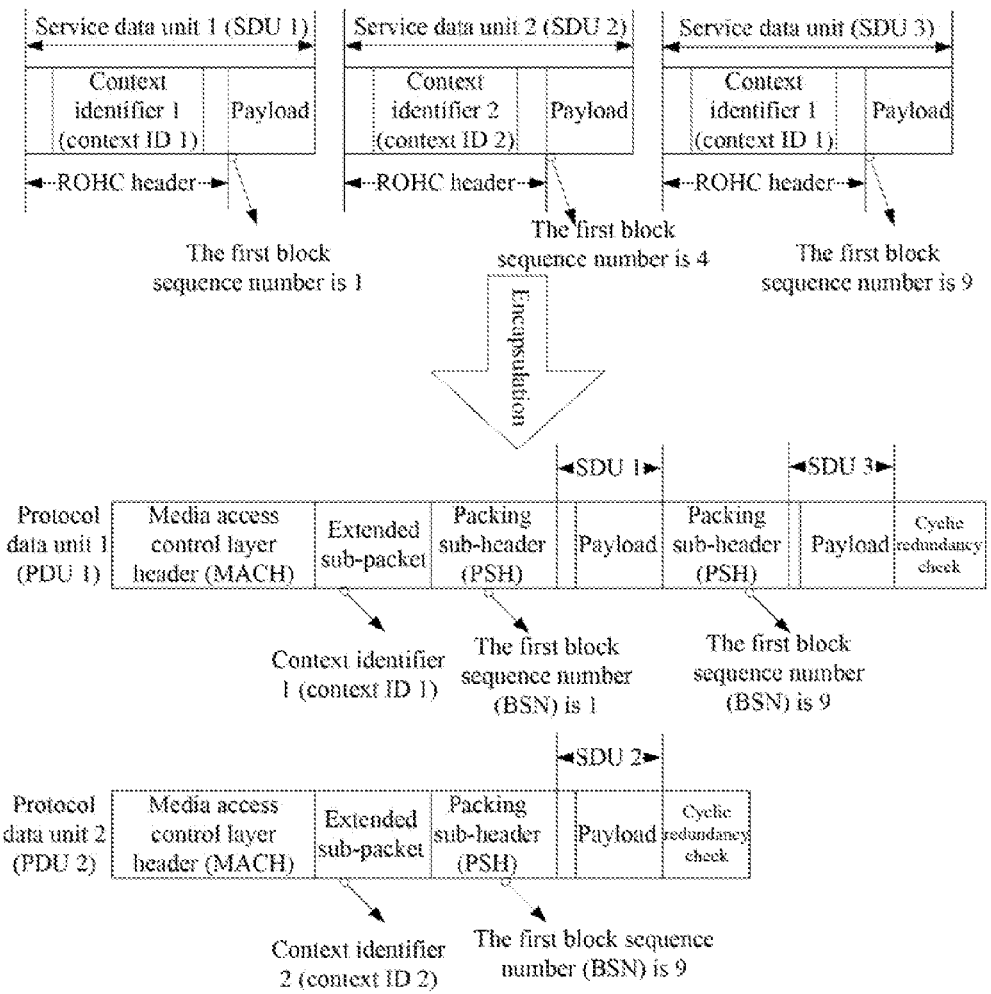
FIG. 3 is a schematic diagram of a method for constructing a MAC-layer PDU according to an embodiment of the present invention.

FIG. 3 is a schematic diagram of a method for constructing a MAC-layer PDU according to an embodiment of the present invention. According to a definition of a basic standard document RFC 3095 of the ROHC, one connection may have context IDs of different ROHCs. A header of each data packet on which the ROHC is performed includes a context ID. The MAC-layer PDU constructing entity may separate SDUs with different context IDs based on the context IDs in the headers of the received SDUs and pack and fragment the SDUs separately. In this manner, SDUs in one MAC-layer PDU have the same context ID. In this case, the context ID in the header of each SDU in a MAC-layer PDU may be omitted, and an extended sub-header may be added to the MAC-layer PDU. The sub-header includes the context ID of the SDUs in this MAC-layer PDU. When the MAC-layer PDU is sent to the receive end, the receive end may restore context ID information in the headers of the SDUs according to the context ID included in the extended sub-header of the MAC-layer PDU. As shown in FIG. 3, SDU 1 and SDU 3 that have the same context ID, that is, context ID 1, are encapsulated into PDU 1, context ID 1 is identified in an extended header of PDU 1, and context ID 1 is omitted in each SDU header, that is, in headers of ROHC data packets. SDU 2 that has a different context ID, that is, context ID 2, is encapsulated into PDU 2, context ID 2 is identified in an extended header of PDU 2, and context ID 2 is also omitted in the headers of ROHC packets.

2. The MAC-layer PDU constructing entity determines whether an SDU is an SDU that has a context information update based on a header format of the SDU, and identifies in the added extended sub-header whether the SDU is the SDU that has the context information update.

According to the definition of RFC 3095, data packet on which the ROHC is performed may be classified into a data packet that has the context information update and a packet that does not have the context information update. If a data packet that does not have the context information update is lost, header decompression of subsequent data packets is not affected. If a data packet that has the context information update is lost, header decompression of subsequent packets may fail.

At the transmit end, the MAC-layer PDU constructing entity may know a data packet that has the context information update according to a header format of a received SDU. Therefore, a first BSN of the SDU can be indicated by using the extended sub-header in the MAC-layer PDU. In this way, a decompressor may know whether an error data packet has the context information update according to a BSN in the MAC-layer PDU.

Figure 4:
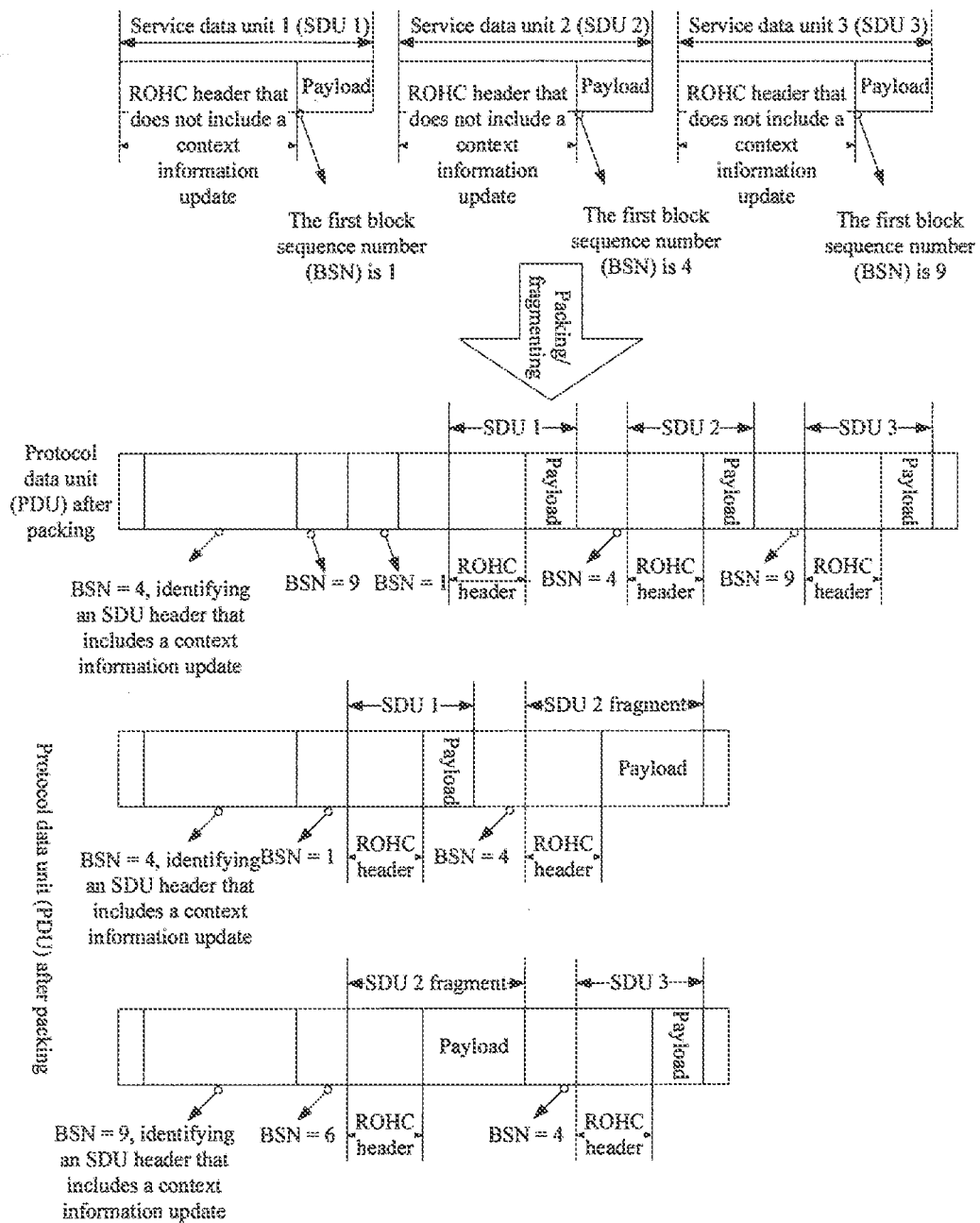
FIG. 4 is a schematic diagram of another method for constructing a MAC-layer PDU according to an embodiment of the present invention.

FIG. 4 shows a specific encapsulation method of a MAC-layer PDU. If different SDUs are packed into a MAC-layer PDU, the MAC-layer PDU may include multiple SDUs that have the context information update. In this case, the MAC-layer PDU constructing entity adds a corresponding number of extended sub-headers according to the number of SDUs that have the context information update. Each extended sub-header includes a first BSN of an SDU that has the context information update. If an SDU is fragmented and packed to different MAC-layer PDUs for transmission, the MAC-layer PDU constructing entity adds only the MAC-layer PDU where a first data block of the SDU that has the context information update is located to a related extended sub-header, where the extended sub-header includes a related BSN.

The preceding two methods for carrying ROHC-related information in an extended sub-header of a MAC-layer PDU can be used at the same time or separately.

It can be understood to those skilled in the art that in addition to the preceding two methods for carrying ROHC-related information in an extended sub-header of a MAC-layer PDU, another implementation method may also be used to carry compression information except the related compression information mentioned in the preceding two methods, which is not described in this embodiment of the present invention. In addition, the BSN mentioned previously may be another representation form of a sequence number (SN), which is not confined by this embodiment and subsequent embodiments of the present invention.

In the third embodiment of the present invention, volume of transmitted data in the ROHC communication method that uses the ARQ mechanism is saved and header decompression at the receive end is facilitated by including ROHC-related information in a MAC-layer PDU.

Embodiment 4

The fourth embodiment of the present invention describes a processing mechanism for a scenario when an error data packet or packet loss occurs during data transmission in an ROHC communication method that uses an ARQ mechanism.

When an ARQ layer at a receive end finds an error data packet during a CRC, the packet is directly dropped, and a NotACKnowledge (NACK) message is sent to an ARQ layer at a transmit end for retransmission according to an existing mechanism.

In a scenario when an ARQ and ROHC are combined, the following problems may occur: A CRC in a MAC-layer PDU is intended for the entire MAC-layer PDU. Therefore, if an error occurs in a SDU payload area, the MAC-layer PDU is dropped at the ARQ layer and is not uploaded to an ROHC layer. Once the number of SDUs included in the MAC-layer PDU exceeds an SWW in a W-LSB algorithm, a subsequent data packet cannot be correctly decompressed at the ROHC layer; or, the MAC-layer PDU includes a data packet that is used for a context information update, and if the MAC-layer PDU is directly dropped, a decompression state machine cannot properly update context information and therefore a subsequent data packet cannot be correctly decompressed.

The ARQ layer at the receive end cannot correctly decompress the received MAC-layer PDU. Therefore, an SDU cannot be parsed from the MAC-layer PDU. In this case, a context ID in a header of the SDU cannot be restored. As the context ID of the error data packet cannot be obtained, related information of the error data packet cannot be stored. After a subsequent data packet that includes the context information update is correctly received, the context information is updated. In this case, even if a retransmitted data packet that passes through the ARQ layer is correctly received at the MAC layer, and the MAC layer sends a correctly parsed SDU to the ROHC layer, header decompression cannot be correctly performed because the context information in the decompression state machine at the ROHC layer is updated. Therefore, in this error case, the ROHC layer cannot correctly perform header decompression even when the ARQ mechanism is used.

If the data packet that cannot be correctly parsed by the ARQ layer at the receive end is an IR data packet, a subsequent data packet may be incorrectly decompressed because no correct SC information is obtained. When the IR data packet is retransmitted and arrives, the ROHC layer in the prior art cannot know that the data packet is a retransmitted data packet. In this case, a ROHC decompressor uses context information in the IR data packet to update existing context information. Therefore, the subsequent data packet cannot be correctly decompressed again.

Figure 5:
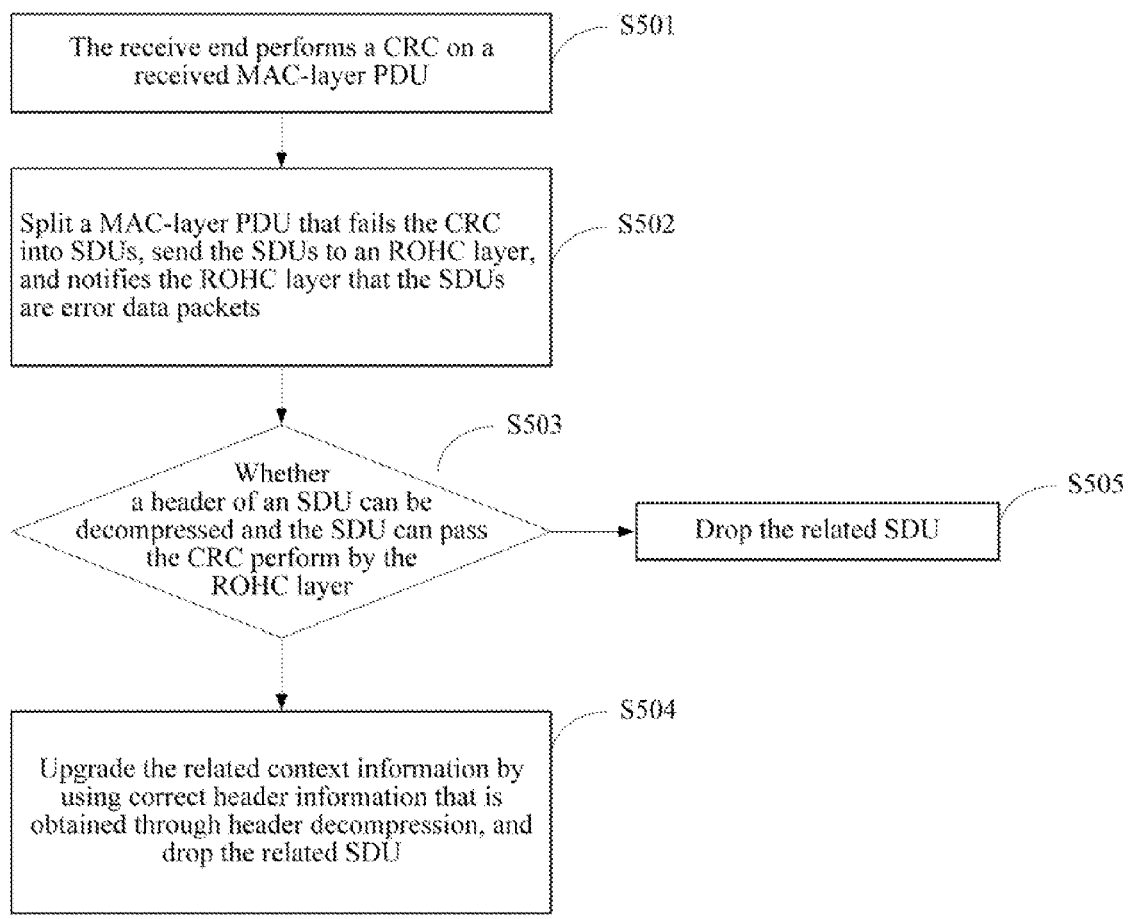
FIG. 5 is a flowchart of a processing method when an error data packet or packet loss occurs during data transmission according to an embodiment of the present invention.

To avoid the preceding cases, this embodiment of the present invention proposes that the following processing mechanism is used when the ARQ layer receives an error data packet:

FIG. 5 is a flowchart of a processing method when an error data packet or packet loss occurs during data transmission according to an embodiment of the present invention:

S501: The receive end performs a CRC on a received MAC-layer PDU.

S502: Split a MAC-layer PDU that fails the CRC into SDUs, send the SDUs to the ROHC layer, and notify the ROHC layer that the SDUs are error data packets.

Specifically, assume that the MAC-layer PDU that fails the CRC is a correct MAC-layer PDU. The MAC-layer PDU is stilled decapsulated into SDUs according to the prior art, the SDUs are sent to the ROHC layer, and the ROHC layer is notified that the SDUs are error data packets.

S503: The ROHC layer determines whether a header of an SDU can be decompressed and whether the SDU can pass the CRC performed by the ROHC layer.

S504: If the header of the SDU can be decompressed and the SDU passes the CRC, update related context information according to correct header information obtained through header decompression and drop the related SDU. The process ends.

S505: If the header of the SDU still cannot be correctly decompressed at the ROHC layer, drop the SDU.

In S505, when the header of the SDU still cannot be correctly decompressed at the ROHC layer, the ROHC layer may wait for a next SDU that has the same context ID as that of the SDU and that can be correctly received by the ARQ layer. The next SDU that has the same context ID and received by the ARQ layer is classified into the following two cases:

Case 1: The header of the SDU can be correctly decompressed at the ROHC layer.

This indicates that a last error or a lost MAC-layer PDU does not cause a fatal error, and a header of a subsequent SDU can be correctly decompressed.

Case 2: The header of the SDU cannot be correctly decompressed at the ROHC layer.

This indicates that the last error or lost MAC-layer PDU causes a fatal error, and the header of the subsequent SDU cannot be correctly decompressed.

The header of the SDU cannot be correctly decompressed. Therefore, the context ID of the SDU cannot be restored. In this embodiment of the present invention, the following method may be used to determine whether the ROHC decompressor can correctly decompress the header of the next SDU that has the same context ID.

After N data packets after the error data packet are received, if a case in which the CRC at the ARQ layer is correct but header decompression fails at the ROHC layer does not occur, it is regarded that the header of the next SDU that has the same context ID can be correctly decompressed by the decompressor at the ROHC layer; if the case in which the CRC at the ARQ layer is correct but header decompression fails at the ROHC layer occurs, it is regarded that the header of the next SDU that has the same context ID cannot be correctly decompressed by the decompressor at the ROHC layer. The N value is related to an actual condition of a system, and may be determined through negotiation when a connection is established or may be manually set.

When the ARQ layer at the receive end determines that the ROHC layer at the receive end encounters a fatal error according to the preceding information, to avoid a problem thereby caused after a retransmitted data packet arrives, the following processing method is used in this embodiment of the present invention:

The decompressor at the ROHC layer determines whether a received SDU is a retransmitted SDU; and when it is determined that the received SDU is a retransmitted SDU, decompress a previously buffered SDU that cannot be correctly decompressed by using the retransmitted SDU.

This embodiment of the present invention provides a method for determining whether the received SDU is a retransmitted SDU.

Figure 6:
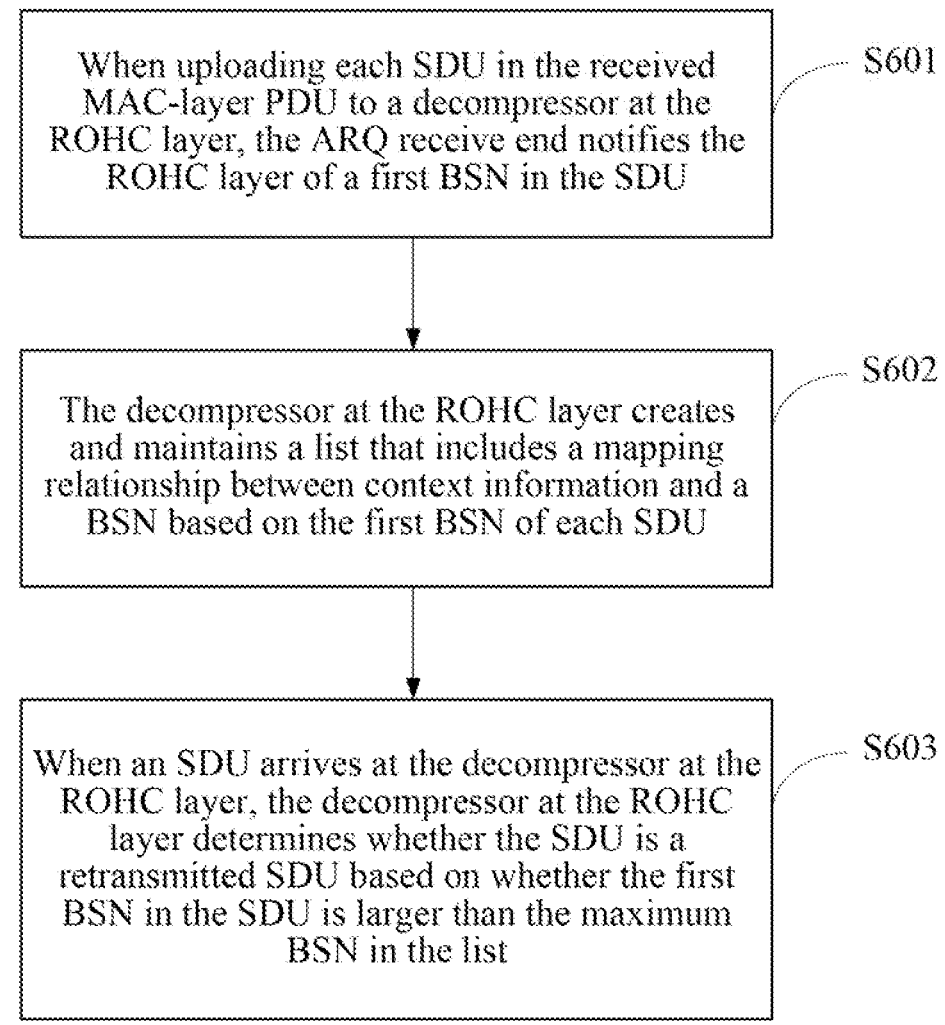
FIG. 6 is a flowchart of a method for determining a retransmitted SDU according to an embodiment of the present invention.

One method can be that the ARQ layer notifies the ROHC layer that the SDU is a retransmitted SDU. Another method is as shown in FIG. 6, including the following steps:

S601: When the ARQ layer at the receive end uploads each SDU in a received MAC-layer PDU to the decompressor at the ROHC layer, notify the decompressor at the ROHC layer of a first BSN in the SDU.

S602: The decompressor at the ROHC layer creates and maintains a list that includes a mapping relationship between context information and a BSN according to the first BSN of each SDU.

S603: Each time when an SDU arrives at the decompressor at the ROHC layer, the decompressor at the ROHC layer determines whether the SDU is a retransmitted SDU according to whether the first BSN of the SDU is larger than the maximum BSN in the list.

Specifically, when determining that the first BSN of the SDU is larger than the maximum BSN maintained in the list, the decompressor at the ROHC layer determines that the SDU is not a retransmitted SDU; and when determining that the first BSN in the SDU is not larger than the maximum BSN maintained in the list, the decompressor at the ROHC layer determines that the SDU is a retransmitted SDU.

A method for determining whether an SDU is a retransmitted SDU may also be: Compare the first BSN of the SDU with a first BSN of a last received SDU; if the first BSN of the SDU is smaller than the first BSN of the last received SDU, determine that the SDU is a retransmitted SDU. It can be understood to those skilled in the art that another method or a combination of the preceding methods for determining whether the SDU is a retransmitted SDU may also be available. The present invention does not confine these methods.

Figure 7:
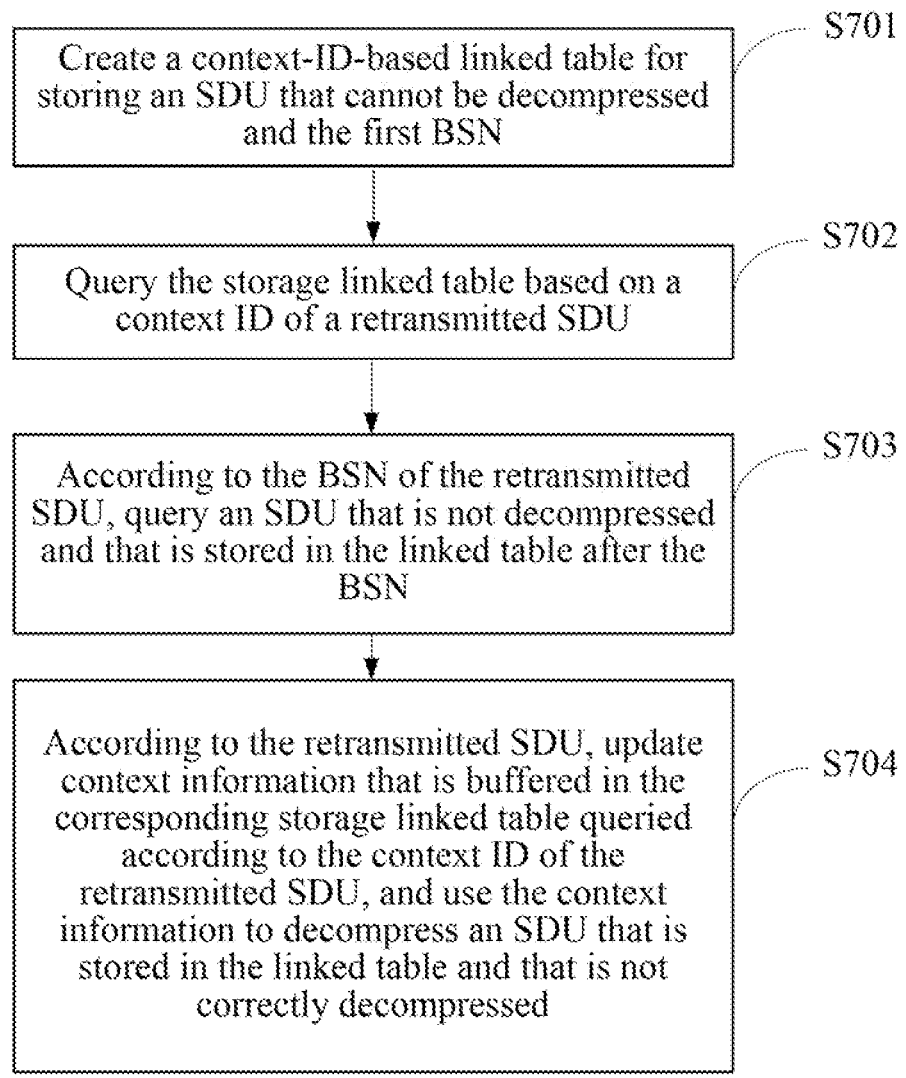
FIG. 7 is a flowchart of a method for decompressing, by using a retransmitted SDU, an SDU that is buffered before decompression but cannot be correctly decompressed according to an embodiment of the present invention.

After it is determined that the SDU is a retransmitted SDU, in this embodiment of the present invention, the retransmitted SDU may be used to decompress a previously buffered SDU that cannot be correctly decompressed, as shown in FIG. 7. The specific method includes:

S701: Create a context-ID-based linked table to store a corresponding SDU that cannot be decompressed and a first BSN.

Figure 8:
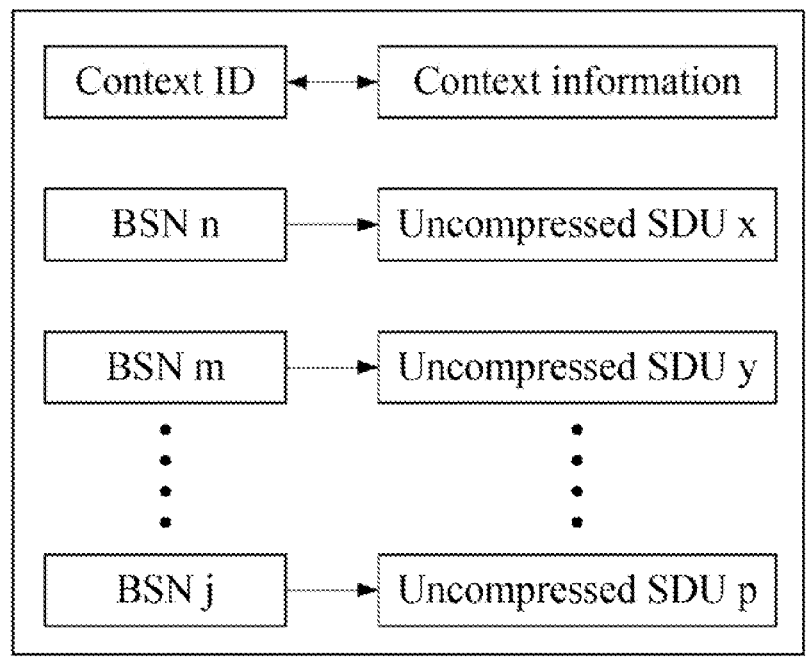
FIG. 8 is a schematic diagram of a context-ID-based linked table for storing an SDU that cannot be decompressed and a first BSN according to an embodiment of the present invention.
Figure 9:
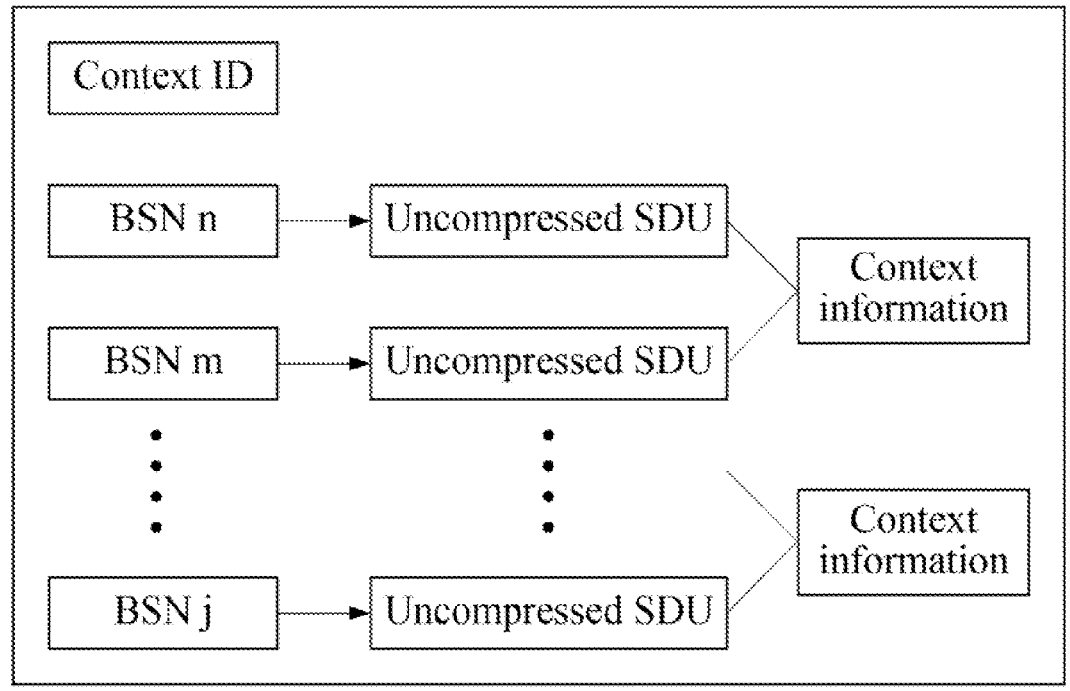
FIG. 9 is a schematic diagram of another context-ID-based linked table for storing an SDU that cannot be decompressed and a first BSN according to an embodiment of the present invention.

When only one fatal error occurs, a form of the linked table may be as shown in FIG. 8; in addition, considering that when multiple fatal errors occur, current context information and a corresponding relation between the context information and a data packet that cannot be decompressed due to a data packet with the fatal error are buffered each time when a fatal error occurs. The form of the linked table may be as shown in FIG. 9.

S702: Query a corresponding storage linked table according to a context ID of the retransmitted SDU.

S703: According to a BSN of the retransmitted SDU, query SDUs that are stored in the linked table and that are not decompressed after the BSN.

Specifically, if the BSN of a first data block in the retransmitted SDU is larger than all BSNs in the storage linked table, it indicates that the SDU is not an SDU that previously causes a fatal error; if the BSN of the first data block in the retransmitted SDU is smaller than all or some BSNs in the storage linked table, it indicates that the SDU is the SDU that previously causes the fatal error.

S704: According to the retransmitted SDU, update context information that is buffered in the corresponding storage linked table queried according to the context ID of the retransmitted SDU, and use the context information to decompress an SDU that is stored in the linked table and that is not correctly decompressed.

In this manner, by using the method according to this embodiment of the present invention, a retransmitted data packet may be identified at the receive end, and be used to decompress an SDU that is not correctly decompressed previously, thereby improving accuracy of data transmission.

In addition, in the preceding case 2 in which the SDU cannot be correctly decompressed at the ROHC layer, as the decompressor at the ROHC layer cannot correctly decompress a subsequent packet, the ARQ layer may process the subsequent packet in the following two methods:

Method 1: Uploading a Subsequent Packet

If the method for encapsulating a MAC-layer PDU in the third embodiment of the present invention, that is, an encapsulation method of identifying whether an SDU has a context information update in an extended sub-header of the MAC-layer PDU, is not used, it cannot be determined whether a subsequent data packet has the context information update at the ARQ layer. As such, in this embodiment, the subsequent data packet that cannot be correctly decompressed is uploaded to the decompressor at the ROHC layer and the decompressor at the ROHC layer continues to attempt to perform decompression. If the decompression cannot be correctly performed, the SDU is buffered at the ROHC layer and attempts to be decompressed only after the subsequent data packet can be correctly decompressed or a retransmitted SDU whose context information is updated arrives. That is, the SDU attempts to be decompressed only after a next SDU that can be correctly received by the ARQ layer and has the same context ID as that of the SDU that cannot be correctly decompressed at the ROHC layer arrives.

When the preceding error data packet cannot be correctly retransmitted within a maximum number of retransmission times or a maximum lifetime, the ARQ layer notifies the decompressor at the ROHC layer that the error data packet cannot be correctly retransmitted, drops the data packets that are buffered at the ROHC layer and that cannot be correctly decompressed due to the error of this packet, and deletes corresponding content from the list maintained by the ROHC layer.

Method 2: Buffering a Subsequent Packet at the ARQ Layer

The ROHC layer cannot correctly decompress the subsequent packet because a fatal error occurs. If the subsequent packet is still uploaded to the ROHC layer, huge system resources are wasted. Therefore, when the MAC-layer PDU constructing entity uses the encapsulation method of identifying whether the SDU has the context information update in the extended sub-header of the MAC-layer PDU in the third embodiment of the present invention, the ARQ layer at the receive end may determine whether context information in the context ID can be updated in a subsequent SDU. As such, in method 2, the subsequent packet is directly buffered at the ARQ layer instead of being uploaded, until a next data packet that has the context information update is correctly received or a retransmitted data packet is correctly received.

Likewise, when the preceding error data packet cannot be correctly retransmitted within the maximum number of retransmission times or the maximum lifetime, the ARQ layer deletes the packets that are buffered at the ROHC layer and that cannot be correctly decompressed due to the error of this packet, and instructs the ROHC layer to delete corresponding content from the list maintained by the ROHC layer.

In addition, when the ARQ layer at the receive end determines that the error data packet does not encounter a fatal error, and therefore the error does not spread, as a subsequent packet is correct, a context ID of an SDU in the error data packet cannot be determined. As a result, the context information required for decompressing this data packet, cannot be buffered. In this case, when a retransmitted data packet arrives, if the context information corresponding to this context ID is updated, the decompressor at the ROHC layer cannot correctly perform decompression even if the retransmitted data packet can be correctly received. Therefore, once the preceding case occurs, the ARQ layer at the receive end needs to immediately instruct the ARQ layer at the transmit end to stop retransmitting this packet, thereby avoiding a waste of air interface resources.

In this embodiment of the present invention, in a transmission mechanism where ROHC and an ARQ are combined, an error may be avoided from spreading and therefore compression efficiency and accuracy are improved when an error data packet or packet loss occurs.

Embodiment 5

This embodiment describes a processing mechanism that combines ROHC feedback and ARQ feedback when an ROHC communication method that uses an ARQ mechanism is adopted.

In the prior art, both ROHC and an ARQ have independent feedback mechanisms. During feedback, resources need to be allocated for both the ARQ feedback and the ROHC. This embodiment of the present invention proposes a processing mechanism that combines the ROHC feedback and the ARQ feedback and uses the ARQ feedback to replace the ROHC feedback, thereby saving system resources.

Figure 10:
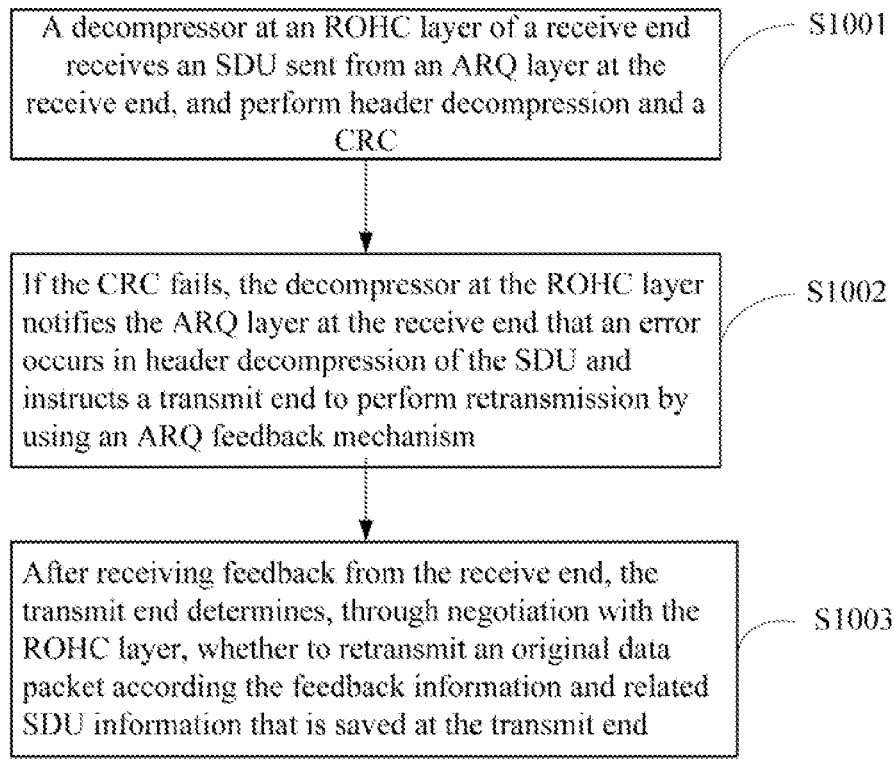
FIG. 10 is a flowchart of a processing method that combines ROHC feedback and ARQ feedback according to an embodiment of the present invention.

As shown in FIG. 10, the method provided in this embodiment includes the following steps:

S1001: A decompressor at an ROHC layer of a receive end receives an SDU sent from an ARQ layer at the receive end, and perform header decompression and a CRC.

S1002: If the CRC fails, the decompressor at the ROHC layer notifies the ARQ layer at the receive end that an error occurs in header decompression of the SDU. The ARQ layer at the receive end instructs a transmit end to perform retransmission by using the ARQ feedback mechanism.

That is, the decompressor at the ROHC layer does not provide feedback to a compressor at the ROHC layer through the original ROHC feedback mechanism, but notifies the ARQ layer at the receive end of a decompression error of this data packet and uses the ARQ feedback mechanism for retransmission.

Specifically, ROHC feedback is classified into DC feedback and SC feedback. In the fourth embodiment, a case in which a data packet that passes the CRC at the ARQ layer of the receive end is sent to the ROHC layer but header decompression fails to be correctly performed exists. Therefore, when a data packet is incorrect, the ARQ feedback replaces the ROHC feedback with information of three bits at most. The first bit indicates whether a data block is correctly received. The second bit indicates whether a header of the data block can be correctly decompressed at the ROHC layer when the data block is incorrectly received at the ARQ layer. The third bit indicates whether a header of an SDU where the data block is located includes an SC error or a DC error.

Figure 11:
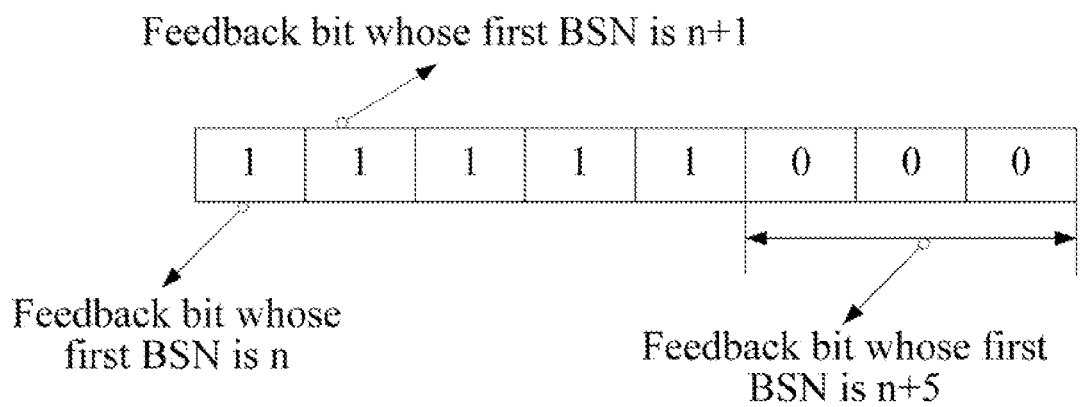
FIG. 11 is a schematic diagram of a bitmap of a retransmission feedback form according to an embodiment of the present invention.

FIG. 11 is a schematic diagram of a bitmap of a feedback form according to an embodiment of the present invention. In this embodiment of the present invention, for an error SDU, a method used by the ARQ layer at the receive end for feeding back error information is to use a three-bit bitmap for a BSN of a first data block in the error SDU to feed back a specific error form, that is, use one bit to indicate whether the SC information or DC information is incorrect (for example, "1" indicates that the SC information is incorrect and "0" indicates that the DC information is incorrect), use another bit to indicate whether ROHC header decompression is correct (for example, "1" indicates that the ROHC header decompression is correct and "0" indicates that the ROHC header decompression is incorrect), and use the last bit to indicate whether the SDU is correctly received (for example, "1" indicates that the SDU is correctly received and "0" incorrectly received). A feedback mode of another data block is the same as the ARQ feedback mode in the prior art; one bit is used in feedback to indicate a transmission result of SDU's first block only if the SDU's first block is correctly received. As the ARQ layer at the transmit end divides an SDU into different data blocks, the ARQ layer at the transmit end knows which data block is the first BSN of the SDU.

In addition, it can be understood to those skilled in the art that the number of bits required for retransmission feedback information may be smaller than three. For example, if the second bit indicates that header compression can be correctly performed, at the ROHC layer, on a data block, the third bit is not required. Likewise, if the first bit indicates that the data block is correctly received, the other two bits for indicating an error type are not required.

S1003: After receiving feedback from the receive end, the transmit end negotiates with the ROHC layer to determine whether to retransmit the original data packet according to the feedback information and related SDU information that is stored at the transmit end.

The ARQ layer at the transmit end interacts with the compressor at the ROHC layer to determine the error SDU and whether the error SDU includes context information. The following cases may be included:

1. The data packet is an important IR data packet that includes SC information. After such a data packet fails to be transmitted, a large number of subsequent data packets fail to be decompressed. In this case, the compressor at the ROHC layer retransmits the IR data packet. If the maximum number of retransmission times or the maximum lifetime is exceeded, the compressor at the ROHC layer needs to transit the compression state machine to an IR state and re-send the IR data packet.

2. The data packet includes DC information. However, due to a restriction on an SWW in a W-LSB algorithm, this data packet is not in a sliding window of the W-LSB. That is, the data packet is lost. A header of a subsequent packet cannot be correctly decompressed because the context information in the data packet is not updated. In this case, the ARQ layer at the transmit end needs to retransmit the data packet. If the maximum number of retransmission times or the maximum lifetime is exceeded, the compressor at the ROHC layer needs to transit the compression state machine to an FO state and update the DC information again.

3. If the data packet does not include context update information, or the context update information is within a scope of the sliding window in the W-LSB algorithm, decompression of the subsequent packet is not affected. If the subsequent packet includes context update information, the decompressor at the ROHC layer updates a context of a decompression state according to the latest context information. In this case, even if the data packet is retransmitted, the decompressor at the ROHC layer cannot use the current context information to correctly perform header decompression on the data packet after the receive end correctly receives the data packet. In this case, if the ROHC supports restoration of the header of the data packet, after header compression is performed according to the latest context information, the BSN is reallocated and the data packet is sent; if the ROHC does not support restoration of the header of the data packet, the data packet is directly dropped.

4. Similar to the third point, if the subsequent packet does not include context update information, the data packet is directly retransmitted.

In this embodiment of the present invention, the ARQ feedback may be used to replace the ROHC feedback in a scheme where the ROHC mechanism and ARQ mechanism are combined, thereby saving system resources.

It should be noted that the schemes in all the preceding embodiments of the present invention apply to, including but not limited to, three traditional ARQ mechanisms (a stop-and-wait ARQ, a go-back-n ARQ, and a selective repeat ARQ).

In addition, under the premise that a bask principle of the present invention is not violated, all methods in the preceding embodiments may be combined for use. All these combinations fall in the scope of protection by the present invention.

Embodiment 6

This embodiment of the present invention provides a method for encapsulating an HARQ-layer sub-packet when ROHC is combined.

An HARQ mechanism is different from a traditional ARQ mechanism. An HARQ is generally used for retransmission at a physical layer. In addition to retransmission, the HARQ also includes FEC, that is, has an error correction function to some extent. An ARQ is used for retransmission at a MAC layer and does not have the error correction function. A sub-packet is a data unit at the physical layer. This data unit is not involved in the ARQ mechanism. The sub-packet is generally applicable only to the HARQ mechanism.

In the prior art, the HARQ allocates several HARQ channels for each connection that supports the HARQ, and encapsulates a PDU from an HARQ connection into an HARQ sub-packets.

After producing sub-packets, the HARQ sends the sub-packets through different HARQ channels to an HARQ layer at a receive end.

Transmission of a sub-packet in each HARQ channel uses a stop-and-wait mechanism. When a check on a sub-packet transmitted on one HARQ channel is incorrect, a data packet on the HARQ channel stops sending a subsequent sub-packet until ACKnowledge (ACK) feedback is successfully received from the receive end. At the same time, an HARQ sub-packet is encapsulated and sent on another HARQ channel corresponding to this HARQ connection, leading to a disorder at the receive end. As an HARQ sub-packet is larger than an SDU and each HARQ sub-packet includes a large number of SDUs, once an HARQ sub-packet is retransmitted, SDUs that are received by an ROHC layer encounter a disorder.

To prevent the preceding case from occurring, this embodiment of the present invention provides the following method for encapsulating a sub-packet when the HARQ and the ROHC are combined. The method includes the following steps:

After receiving an SDU sent by the ROHC layer, the MAC layer encapsulates the SDU into a PDU and sends the PDU to the HARQ layer; and the HARQ layer encapsulates the PDU into a sub-packet, where, a first SDU in a first PDU with each context ID in the encapsulated sub-packet is an IR packet.

Figure 12:
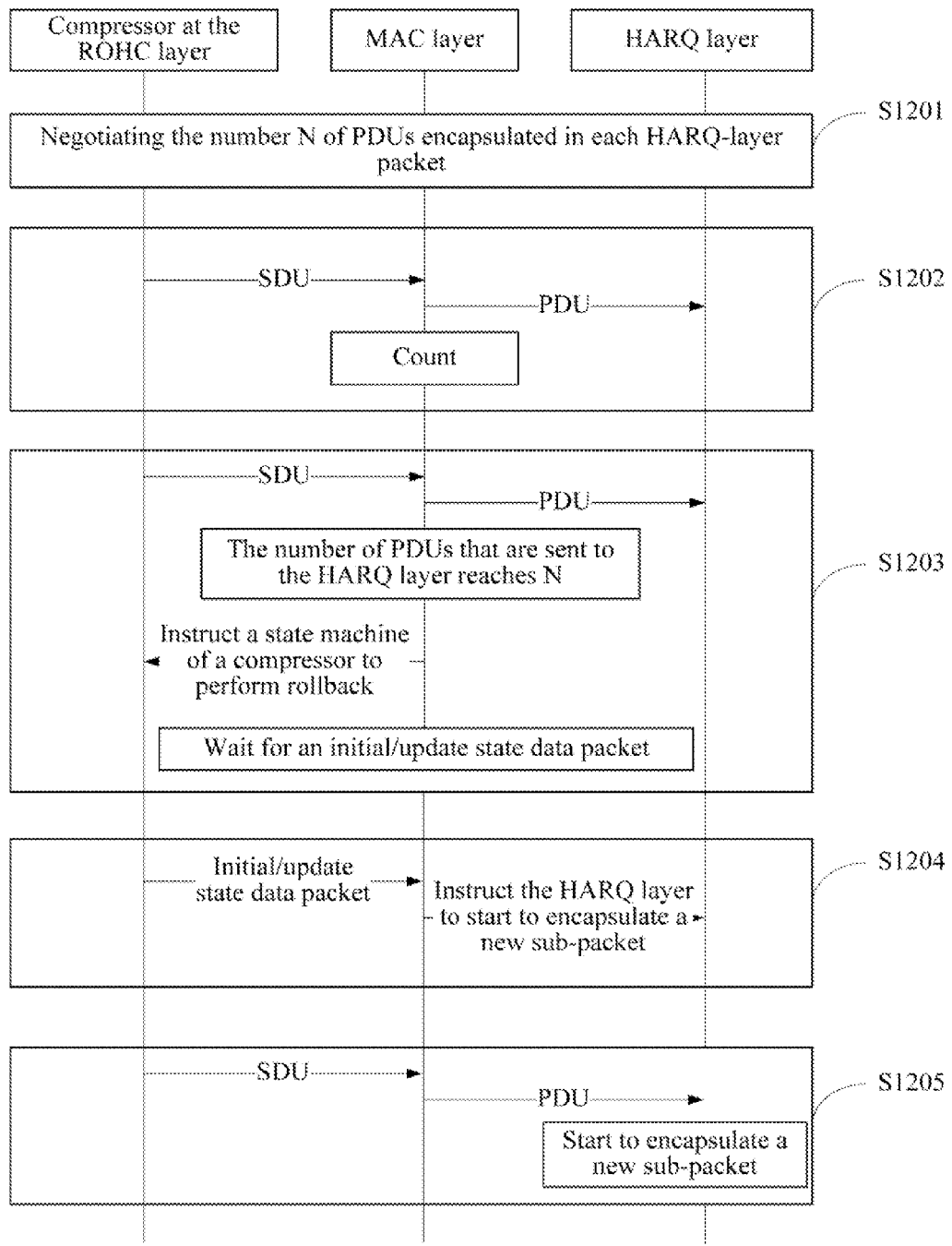
FIG. 12 is a flowchart of a method for encapsulating a sub-packet in an HARQ when ROHC is combined according to an embodiment of the present invention.

For specific implementation, see FIG. 12. The following implementation method may be used. The detailed description is as follows:

S1201: The HARQ layer, the MAC layer, and the ROHC layer negotiate the number N of PDUs encapsulated in each HARQ packet before the ROHC layer starts compression;

where, an N value is a number supported by the HARQ layer, the MAC layer, and the ROHC layer; specifically, the N value is related to a size of a MAC-layer PDU and a modulated coding scheme (MCS) used by the HARQ.

S1202: The ROHC layer starts the compression and sends an SDU to the MAC layer. After receiving the SDU, the MAC layer encapsulates the SDU into a PDU and sends the PDU to the HARQ layer. In addition, the number of PDUs that are sent to the HARQ layer is recorded at the MAC layer.

S1203: When the number, which is recorded at the MAC layer, of PDUs that are sent to the HARQ layer reaches N, the MAC layer clears a counter of the MAC layer, instructs an ROHC compressor that corresponds to each context ID on an HARQ connection corresponding to the HARQ channel to roll back a compression state, and then starts to wait for an IR data packet from the ROHC layer.

S1204: After the IR data packet sent by the ROHC layer is received, the HARQ layer is instructed to start to encapsulate a new sub-packet.

S1205: After receiving the notification from the MAC layer, the HARQ layer receives a first PDU and starts to encapsulate the new sub-packet from this PDU.

By using the method provided in this embodiment of the present invention, it is ensured that the first SDU in the first PDU with each context ID in an encapsulated sub-packet is an IR packet, thereby ensuring that a subsequent packet can be correctly decompressed. In this case, decompression is not affected even if a disorder of sub-packets occurs.

The IR data packet may also be another initialization and state information update packet, which is not confined by this embodiment of the present invention.

Those killed in the art may understand that all or part of the processes in the methods according to the preceding embodiments may be implemented by using a computer program to instruct related hardware. The program can be stored in a readable storage medium of a computer. When the program is executed, the processes in the methods in the preceding embodiments may be performed. The storage medium may be a diskette, a Compact Disk-Read Only Memory (CD-ROM), a Read-Only Memory (ROM), or a Random Access Memory (RAM).

Figure 13:
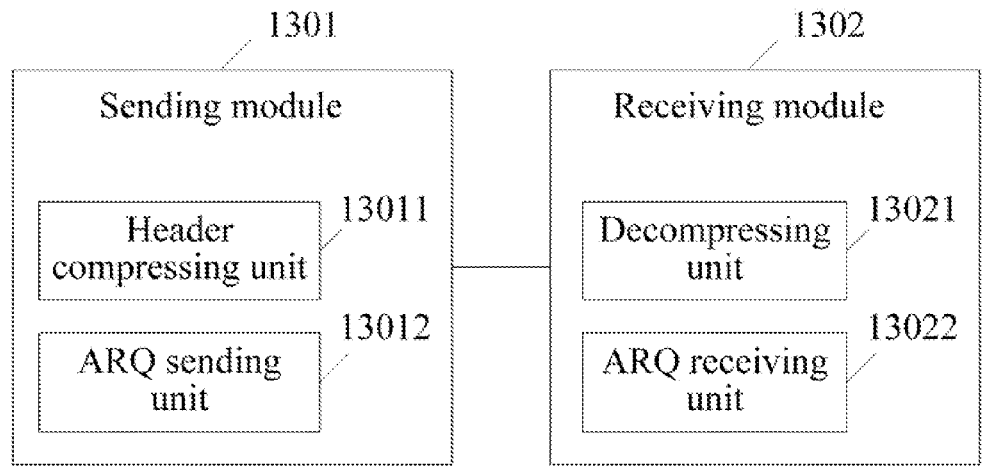
FIG. 13 is a schematic structural diagram of a communication apparatus for header compression by using an automatic retransmission mechanism according to an embodiment of the present invention.

As shown in FIG. 13, an embodiment of the present invention provides a communication apparatus for header compression by using an ARQ mechanism. The apparatus includes a sending module 1301 and a receiving module 1302.

The sending module 1301 is configured to determine parameters required for performing header compression and an ARQ with the receiving module 1302 through negotiation, construct a lower-layer PDU that includes header compression information and send the PDU to the receiving module 1302, and interact with the receiving module 1302 to perform header compression communication.

The receiving module 1302 is configured to determine the parameters required for performing the header compression and the ARQ with the sending module 1301 through negotiation, receive the lower-layer PDU that is sent by the sending module 1301 and includes header compression information, and interact with the sending module 1301 to perform header compression communication.

The sending module 1301 further includes a header compressing unit 13011 and an ARQ sending unit 13012, where:

the header compressing unit 13011 is configured to perform header compression processing on data; and the ARQ sending unit 13012 is configured to add an extended sub-header to a lower-layer PDU, include the header compression information in the extended sub-header, and send the lower-layer PDU to the receiving module 1302.

The receiving module 1302 further includes a decompressing unit 13021 and an ARQ receiving unit 13022, where:

the ARQ receiving unit 13022 is configured to receive the lower-layer PDU that is sent by the ARQ sending unit 13012 and includes the header compression information, process the lower-layer PDU into an SDU, and send the SDU to the decompressing unit 13021; and the decompressing unit 13021 is configured to decompress a received SDU.

The header compression may be ROHC, and the lower-layer PDU may be a MAC-layer PDU.

Figure 14:
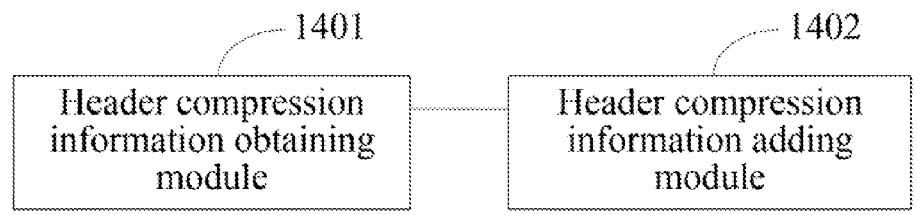
FIG. 14 is a schematic structural diagram of an apparatus for constructing a PDU according to an embodiment of the present invention.

As shown in FIG. 14, an embodiment of the present invention provides an apparatus for constructing a PDU. The apparatus includes a header compression information obtaining module 1401 and a header compression information adding module 1402, where:

the header compression information obtaining module 1401 is configured to obtain header compression information from an SDU whose header is compressed and send the information to the header compression information adding module 1402;

the header compression information adding module 1402 is configured to add an extended sub-header to a PDU, and add the header compression information to the extended sub-header; and the header compression information may include a context 1D of the SDU or information that indicates whether the SDU has a context information update.

The header compression may be ROHC, and the lower-layer PDU may be a MAC-layer PDU.

Figure 15:
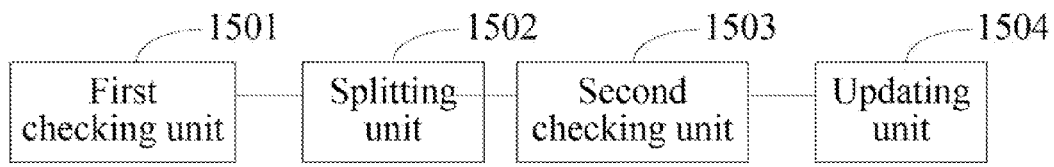
FIG. 15 is a schematic structural diagram of an apparatus for processing a compression error by using an automatic retransmission mechanism according to an embodiment of the present invention.

As shown in FIG. 15, an embodiment of the present invention provides an apparatus for processing a header compression error by using an ARQ mechanism. The apparatus includes a first checking unit 1501, a splitting unit 1502, a second checking unit 1503, and an updating unit 1504, where:

the first checking unit 1501 is configured to perform a CRC on a received PDU;

the splitting unit 1502 is configured to split a PDU that fails the check into SDUs, send the SDUs to a header compression layer, and notify the header compression layer that the SDUs may be incorrect;

the second checking unit 1503 is configured to determine whether a packet header of an SDU can be decompressed and whether the SDU passes the CRC performed by the header compression layer; and the updating unit 1504 is configured to update related context information based on correct header information that is obtained through packet header decompression when the second checking unit 1503 confirms that the packet header of the SDU can be decompressed and the SDU passes the CRC performed by the header compression layer.

The header compression may be ROHC, and the lower-layer PDU may be a MAC-layer PDU.

Figure 16:
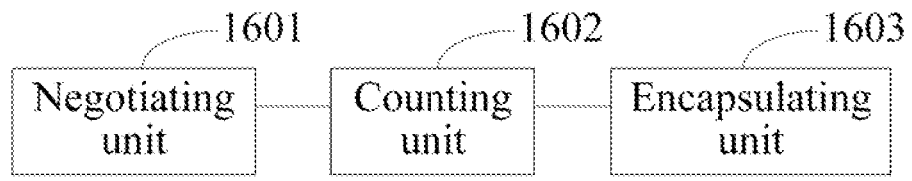
FIG. 16 is a schematic structural diagram of an apparatus for encapsulating a sub-packet in an HARQ when a header compression mechanism is combined according to an embodiment of the present invention.

As shown in FIG. 16, an embodiment of the present invention provides a sub-header encapsulating apparatus in an HARQ when a header compression mechanism is combined. The encapsulating apparatus includes a negotiating unit 1601, a counting unit 1602, and an encapsulating unit 1603. The negotiating unit 1601 is configured to determine the number N of PDUs encapsulated in a sub-packet of each HARQ through negotiation before a header compression layer performs compression, where N is a number supported by an HARQ layer, a MAC layer, and the header compression layer.

The counting unit 1602 is configured to record the number of PDUs that are sent by the MAC layer to the HARQ layer, where when the number reaches N, the counting unit is reset and instructs a compressor at the header compression layer that corresponds to each context ID on a connection corresponding to an HARQ channel to roll back a state.

The encapsulating unit 1603 is configured to start to encapsulate an HARQ sub-packet at the HARQ layer after the MAC layer receives an SDU that belongs to an initialization and state information update packet, where a first SDU in a first PDU with each context ID encapsulated by each sub-packet is an initialization and state information update packet.

The header compression may be an ROHC, and the lower-layer PDU may be a MAC layer PDU.

Figure 17:
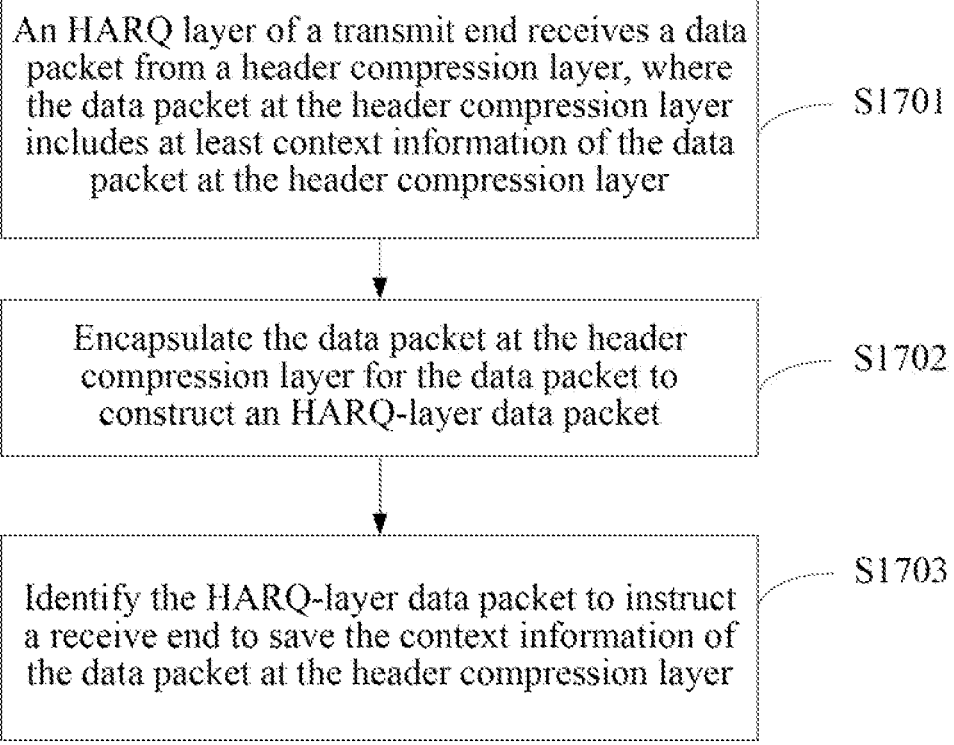
FIG. 17 is a basic schematic flowchart of a method for data packet compression based on a multi-process HARQ according to an embodiment of the present invention.

FIG. 17 is a basic schematic flowchart of a method for data packet compression based on a multi-process HARQ according to an embodiment of the present invention. It should be noted that this embodiment takes the HARQ as an example, but those skilled in the art may understand that the technical solution in the present invention may apply to an ARQ, and the difference lies in: In an ARQ mechanism, a packet number of an ARQ-layer data packet is used as a criterion for determining a data packet sequence, and the indication information that instructs a receive end to store context information of a data packet of the header compression layer in the data packet of the header compression layer is encapsulated in an extended sub-header of an RLC-layer (a MAC-layer for an IEEE 802.16 system) data packet and sent to the receive end.

FIG. 17 is a basic schematic flowchart of a method for data packet compression based on a multi-process HARQ according to an embodiment of the present invention. The method includes the following steps:

S1701: An ARQ layer of a transmit end receives a data packet sent from a header compression layer, where the data packet of the header compression layer includes at least context information.

It should be noted that in this embodiment, the header compression layer may be an ROHC layer.

S1702: Encapsulate the data packet of the header compression layer for the data packet to construct an HARQ-layer data packet.

When the ROHC and the ARQ or the HARQ are combined, the ARQ layer or the HARQ layer under the ROHC layer has its own packet SNs. These packet SNs provide sequence information of a data packet for the ROHC layer. For example, for an ARQ-layer data packet, a decompressor may obtain a packet SN at an RLC layer. For an HARQ-layer data packet, the decompressor may obtain information equivalent to a packet number of the HARQ-layer data packet. The ARQ layer (or the HARQ layer) encapsulates the data packet of the header compression layer (such as an ROHC-layer packet) into an ARQ-layer data packet and then sends the data packet to a receive end.

S1703: identify the HARQ-layer data packet to instruct a receive end to save the context information of the data packet of the header compression layer in the data packet of the header compression layer.

To keep synchronization of context information between a compressor and a decompressor so as to ensure that ROHC data packets arrive or are received in sequence, the compressor at the ROHC layer of the transmit end needs to notify the receive end of the ROCH-layer data packets whose context information needs to be saved by the receive end after these data packets are successfully decompressed by the compressor at the ROHC layer. In this embodiment, the following methods may be used to achieve the preceding purpose.

Method 1:

When the number of encapsulated data packets at the header compression layer (for example, the ROHC layer) reaches a preset number, an extended sub-header is added to the ARQ-layer data packet, where the extended sub-header includes indication information that instructs the transmit end to save the context information in the data packet of the header compression layer. For example, when the number of encapsulated data packets at the header compression layer (for example, the ROHC layer) reaches the preset number, an extended sub-header is added to the ARQ-layer data packet.

It should be noted that, in method 1, in an IEEE 802.16 system, when the ARQ mechanism is used, the preceding indication information is equivalent to an extended sub-header included in a MAC-layer data packet; when the HARQ mechanism is used, the preceding indication information is equivalent to an extended sub-header included in a physical-layer (PHY-layer) data packet; or, in a Long Term Evolution (LTE) system, when the ARQ mechanism is used, the preceding indication information is equivalent to an extended sub-header included in an RLC-layer data packet; when the HARQ mechanism is used, the preceding indication information is equivalent to an extended sub-header included in a MAC-layer data packet.

Method 2:

When the number of encapsulated data packets at the header compression layer reaches a preset number, increase a packet number of the ARQ-layer data packet by one, where the packet number after being increased by one instructs the receive end to save the context information of the data packet of the header compression layer in the data packet of the header compression layer.

In method 1 and method 2, the preset number can be set by the transmit end, for example, to a size of a sliding window (that is, an SWW) at the transmit end when a W-LSB coding scheme is used. In this embodiment, the context information of the data packet of the header compression layer packet that needs to be saved by the receive end is context information of the last data packet of the header compression layer obtained after the ARQ-layer (or HARQ-layer) data packet is decompressed.

In the preceding embodiment, by identifying the indication information that is used to instruct the receive end to save the context information of the data packet of the header compression layer in the HARQ-layer (or ARQ-layer) data packet that encapsulates the data packet of the header compression layer (such as the ROHC layer), context information between the compressor and the decompressor is synchronized. Therefore, when a data packet is retransmitted, the data packet may still be correctly decompressed according a related packet number sequence.

Figure 18:
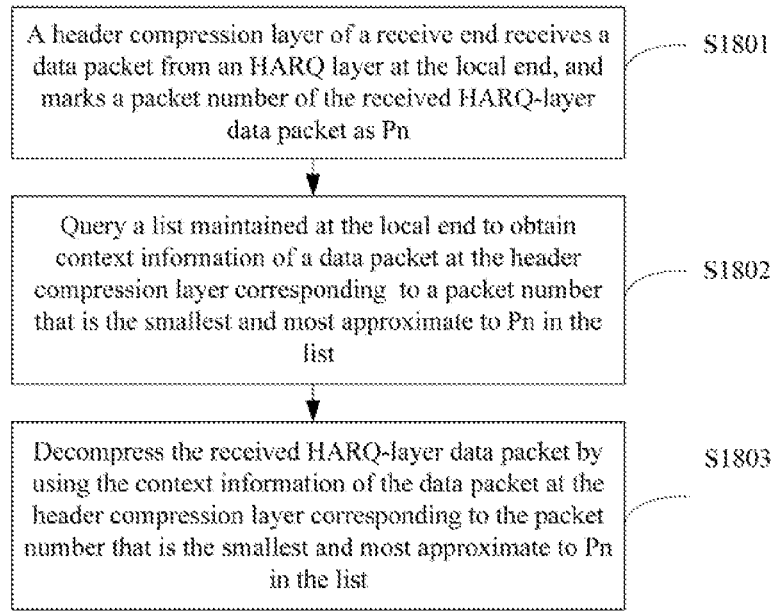
FIG. 18 is a basic schematic flowchart of a method for data packet decompression based on a multi-process HARQ according to an embodiment of the present invention.

FIG. 18 is a basic schematic flowchart of a method for data packet decompression based on a multi-process HARQ according to an embodiment of the present invention. It should be noted that this embodiment takes the HARQ as an example, but those skilled in the art may understand that the technical solution in the present invention may apply to an ARQ, and the difference lies in: In an ARQ mechanism, a data packet number of an ARQ-layer data packet is used as the criterion for determining a data packet sequence, and the indication information that instructs a receive end to store context information of a data packet of the header compression layer in the data packet of the header compression layer is encapsulated in an extended sub-header of an RLC-layer data packet and sent to the receive end.

FIG. 18 is a basic schematic flowchart of a method for data packet decompression based on a multi-process ARQ according to an embodiment of the present invention. The method includes the following steps:

S1801: A header compression layer of a receive end receives a data packet and a related packet number from an HARQ layer at the local end, and marks the packet number of the received HARQ-layer data packet as Pn.

In this embodiment, after correctly receiving and decompressing packets, the HARQ layer or the ARQ layer at the receive end sends these data packets to the header compression layer (such as an ROHC layer), and uploads a packet number of an HARQ-layer (or an ARQ-layer) data packet that encapsulates these data packets to the header compression layer (such as the ROHC layer). If it is detected that a data packet has an ID that is used to instruct the receive end to save context information of a data packet of the header compression layer in the data packet of the header compression layer, for example, indication information that instructs the receive end to save the context information of the data packet of the header compression layer in the data packet of the header compression layer and is included in an extended sub-header of the HARQ-layer data packet (or the ARQ-layer data packet). In addition, the ID needs to be notified to a decompressor at the ROHC layer. After receiving the ID, the decompressor only needs to save only context information of the last data packet of the header compression layer (such as an ROHC-layer data packet) obtained after the HARQ-layer (or ARQ-layer) data packet is decompressed.

S1802: Query a list maintained at the local end to obtain context information of a data packet of the header compression layer, where the data packet corresponds to a packet number that is the smallest and most approximate to Pn in the list.

In this embodiment, the method for generating the list is as follows:

saving context information Mc of the last data packet of the header compression layer obtained after the HARQ-layer (or ARQ-layer) data packet is decompressed; and creating a list that includes a mapping relationship between the context information Mc of the data packet of the header compression layer and a packet number of the HARQ-layer (or ARQ-layer) data packet that encapsulates the context information Mc of the data packet of the header compression layer.

Specifically, at one end of the decompressor, each time when data packets at the header compression layer (such as the ROHC layer) of the transmit end are uploaded from the HARQ layer (or the ARQ layer), the decompressor receives information about a packet number of a homing HARQ-layer (or ARQ-layer) data packet of these data packets from the HARQ layer (or the ARQ layer). If these packets also include an ID indicating that context information needs to be saved, after all data packets at the header compression layer (such as the ROHC layer) encapsulated in the HARQ-layer (or ARQ-layer) data packet are correctly decompressed, context information of the last correctly decompressed data packet of the header compression layer is saved. In this case, at the decompressor end, a list that includes a mapping relationship about the packet number of the HARQ-layer (or ARQ-layer) data packet and the saved context information of the data packet of the header compression layer is saved and maintained.

It should be noted that in this embodiment, the receive end may also allocate a packet number to an HARQ-layer (or ARQ-layer) data packet in the list according to a sequence of time when the data packet arrives at the receive end. That is, each time when an HARQ-layer (or ARQ-layer) data packet arrives, an SN of the HARQ-layer (or ARQ-layer) data packet is increased by one on the basis of a packet number of a last HARQ-layer (or ARQ-layer) data packet that is not retransmitted. Packet numbers can be allocated to HARQ-layer (or ARQ-layer) data packets at the receive end. Therefore, the transmit end does not need to add packet numbers to these data packets when sending these data packets. If an HARQ-layer (or ARQ-layer) data packet is retransmitted, a packet number that is allocated to the data packet when the HARQ-layer (or ARQ-layer) data packet is received at the first time remains unchanged; and S1803: Decompress the received HARQ-layer (or ARQ-layer) data packet by using the context information of the data packet of the header compression layer, where the data packet corresponds to the packet number that is the smallest and most approximate to Pn in the list.

If the list that includes the mapping relationship between the context information Mc of the data packet of the header compression layer and the packet number of the HARQ-layer (or ARQ-layer) data packet that encapsulates the context information Mc of the data packet of the header compression layer is created according to S1802, when decompression is performed at the header compression layer (such as the ROHC layer), query context information of a data packet of the header compression layer corresponding to a packet number that is the most approximate to and lower than the packet number of the HARQ-layer (or ARQ-layer) data packet in the preceding list. Once the context information is found, the context information is used to decompress the data packet of the header compression layer (such as the ROHC layer). For a data packet context information of which is not to be saved as notified by the HARQ layer (or the ARQ layer), the context information does not need to be updated and saved according to an original mechanism even if decompression is correctly performed.

It can be known from this embodiment that context information of the data packet of the header compression layer corresponding to the packet number that is the most approximate to and lower than the packet number of the HARQ-layer (or ARQ-layer) data packet in the list is used when decompression is performed at the header compression layer (such as the ROHC layer). Therefore, even if a data packet of the header compression layer arrives in a disorder due to loss of synchronization of context information, the decompressor at the header compression layer can still correctly decompress the data packet of the header compression layer, thereby improving a data transmission efficiency and reducing a waste of system resources when the ARQ (or HARQ) mechanism and the header compression (such as ROHC) mechanism are combined.

Figure 19:
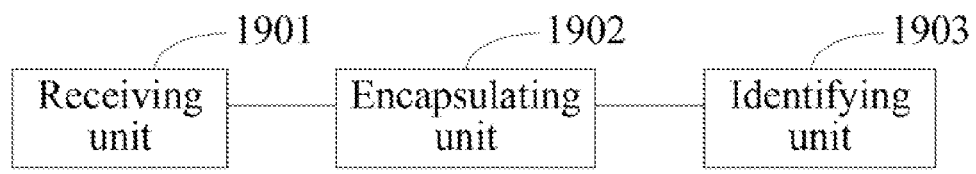
FIG. 19 is a basic schematic flowchart of an apparatus for data packet compression based on a multi-process HARQ according to an embodiment of the present invention.

FIG. 19 is a basic schematic flowchart of an apparatus for data packet compression based on a multi-process HARQ according to an embodiment of the present invention.

It should be noted that this embodiment takes the HARQ as an example, but those skilled in the art may understand that the technical solution in the present invention may apply to an ARQ, and the difference lies in: In an ARQ mechanism, a packet number of an ARQ-layer data packet is used as a criterion for determining a data packet sequence, and the indication information that instructs a receive end to store context information of a data packet of the header compression layer in the data packet of the header compression layer is encapsulated in an extended sub-header of an RLC-layer (a MAC-layer for an IEEE 802.16 system) data packet and sent to the receive end.

To facilitate description, only a part related to this embodiment of the present invention is illustrated. The apparatus for data packet compression based on a multi-process HARQ according to the embodiment shown in FIG. 19 includes:

a receiving unit 1901, configured to receive a data packet sent from a header compression layer, where the data packet of the header compression layer includes at least context information;

an encapsulating unit 1902, configured to encapsulate the data packet of the header compression layer received by the receiving unit 1901 for the data packet to construct an HARQ-layer data packet; and an identifying unit 1903, configured to identify the HARQ-layer data packet that is encapsulated by the encapsulating unit 1902 to instruct a receive end to save context information of the data packet of the header compression layer in the data packet of the header compression layer.

Figure 20:
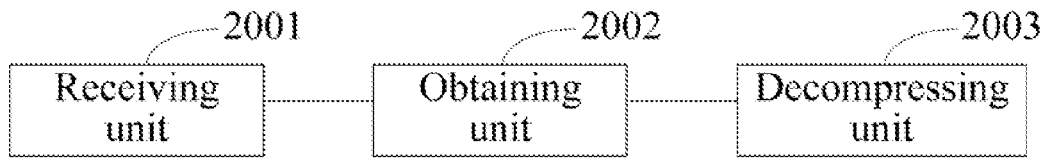
FIG. 20 is a basic logical schematic flowchart of an apparatus for packet decompression based on a multi-process HARQ according to an embodiment of the present invention.

FIG. 20 is a basic logical schematic flowchart of an apparatus for packet decompression based on a multi-process HARQ according to an embodiment of the present invention.

It should be noted that this embodiment takes the HARQ as an example, but those skilled in the art may understand that the technical solution in the present invention may apply to an ARQ, and the difference lies in: In an ARQ mechanism, a packet number of an ARQ-layer data packet is used as a criterion for determining a data packet sequence, and the indication information that instructs a receive end to store context information of a data packet of the header compression layer in the data packet of the header compression layer is encapsulated in an extended sub-header of an RLC-layer (a MAC-layer for an IEEE 802.16 system) data packet and sent to the receive end.

To facilitate description, only a part related to this embodiment of the present invention is illustrated. The apparatus for data packet decompression based on a multi-process HARQ according to the embodiment shown in FIG. 20 includes:

a receiving unit 2001, configured to receive a data packet and a related packet number from an HARQ layer of a receive end, and mark the packet number of the received HARQ-layer data packet as Pn;

an obtaining unit 2002, configured to query a list maintained at the local end to obtain context information of a data packet of a header compression layer, where the data packet corresponds to a packet number that is the smallest and most approximate to Pn in the list, after the receiving unit 2001 receives the data packet and the related packet number from the HARQ layer of the receive end; and a decompressing unit 2003, configured to decompress the received HARQ-layer data packet by using the context information of the data packet of the header compression layer, where the data packet corresponds to the packet number that is the smallest and most approximate to Pn in the list and the context information is obtained by the obtaining module 2002.

The apparatus further includes:

a saving unit, configured to save context information Mc of the last data packet of the header compression layer obtained after the HARQ-layer data packet is decompressed; and a list generating unit, configured to create a list that includes a mapping relationship between the context information Mc of the data packet of the header compression layer and a packet number of the HARQ-layer data packet that encapsulates the context information Mc of the data packet of the header compression layer based on the context information Mc of the last data packet of the header compression layer obtained after the HARQ-layer data packet is decompressed, where the context information Mc is saved by the saving unit; and a packet number allocating unit, configured to allocate, according to a sequence of time when an HARQ-layer data packet arrives at the receive end, a packet number to the HARQ-layer data packet in the list that is generated by the list generating unit.

Those skilled in the art may understand that all or part of the steps in the methods of the preceding embodiments may be completed by using a program to instruct related hardware. The program can be stored in a readable storage medium of a computer. The storage medium may include a ROM, a RAM, a disk, or a CD-ROM.

The preceding describes a method for link management, a corresponding link management entity, a link execution node, and a mobile communication system that are provided by the embodiments of the present invention in detail. Several specific examples are adopted to illustrate the principles and implementation methods of the present invention. The preceding descriptions of the embodiments are used only to help understanding of the methods and core principles of the present invention. Those skilled in the art can make various modifications and variations to the invention without departing from the idea and scope of the present invention. The invention is intended to cover the modifications and variations provided that they fall in the scope of protection defined by the present invention.

What is claimed is:

1. A communication method for header compression by using an Auto-Repeat reQuest (ARQ) mechanism, comprising:

determining, by a transmit end and a receive end, parameters required for performing header compression and an ARQ through negotiation;

constructing, by a lower-layer protocol data unit (PDU) constructing entity of the transmit end, a lower-layer PDU that comprises header compression information and sending the lower-layer PDU to the receive end; and interacting with the receive end to perform header compression, wherein the interacting with the receive end comprises determining, by an ARQ layer of the transmit end, through negotiation with the header compression layer, whether to retransmit an original data packet based on feedback information and related service data unit (SDU) information that is saved at the transmit end after receiving feedback from the receive end.

2. The method according to claim 1, wherein, before or at the same time of the determining, by the transmit end and receive end, the parameters required for the header compression and the ARQ through negotiation, the method further comprises:

determining, by a header compression layer and an ARQ layer, related parameters through negotiation.

3. The method according to claim 1, wherein, the constructing, by the lower-layer PDU constructing entity of the transmit end, the lower-layer PDU that comprises the header compression information comprises:

adding an extended sub-header to the lower-layer PDU, wherein the extended sub-header comprises the header compression information.

4. The method according to claim 3, wherein, the constructing, by the lower-layer PDU constructing entity of the transmit end, the lower-layer PDU that comprises the header compression information comprises:

receiving a service data unit (SDU) from the header compression layer;

encapsulating, by the lower-layer PDU constructing entity, SDUs with a same context identifier into a lower-layer PDU; and adding the context identifier to an extended sub-header of the PDU and removing the context identifier from the SDUs.

5. The method according to claim 3, wherein, the constructing, by the lower-layer PDU constructing entity of the transmit end, the lower-layer PDU that comprises the header compression information comprises:

receiving a service data unit (SDU) from the header compression layer;

determining, by the lower-layer PDU constructing entity, whether the SDU has a context information update based on a header format of the SDU; and identifying an SDU that has the context information update in the extended sub-header of the lower-layer PDU.

6. A method according to claim 1, wherein, the header compression is Robust Header Compression (ROHC), and the lower-layer PDU is a PDU at a Media Access Control (MAC) layer.

7. A communication method for header compression by using an Auto-Repeat reQuest (ARQ) mechanism, comprising:

determining parameters required for header compression and an ARQ through negotiation with a transmit end;

receiving a lower-layer protocol data unit (PDU) that comprises header compression information; and interacting with the transmit end to perform header decompression, wherein the interacting with the transmit end to perform header compression comprises one of:

performing a cyclic redundancy check (CRC) on the received lower-layer PDU; splitting a lower-layer PDU that fails the check into service data units (SDUs), sending the SDUs to a header compression layer, and notifying the header compression layer that the SDUs are error data packets; and if the header compression layer can decompress a header of an SDU that is split from the lower-layer PDU, and the SDU passes the CRC performed by the header compression layer, updating related context information based on correct header information obtained through header decompression and dropping the SDU; and when a decompressor at a header compression layer of the receive end receives a service data unit (SDU) from an ARQ layer, and the SDU after header decompression fails a cyclic redundancy check (CRC), notifying, by the decompressor at the header compression layer of the receive end, the ARQ layer of the receive end that an error occurs in decompression of the SDU, and instructing, by the ARQ layer of the receive end, the transmit end to perform retransmission.

8. The method according to claim 7, wherein, before or at the same time of the determining the parameters required for the header compression and the ARQ through negotiation with the transmit end, the method further comprises:
determining, by a header compression layer and an ARQ layer, related parameters through negotiation.

9. The method according to claim 7, wherein the interacting with the transmit end to perform header compression comprises:
performing a cyclic redundancy check (CRC) on the received lower-layer PDU;
splitting a lower-layer PDU that fails the check into service data units (SDUs), sending the SDUs to a header compression layer, and notifying the header compression layer that the SDUs are error data packets; and
if the header compression layer can decompress a header of an SDU that is split from the lower-layer PDU, and the SDU passes the CRC performed by the header compression layer, updating related context information based on correct header information obtained through header decompression and dropping the SDU.

10. The method according to claim 9, wherein, if the header compression layer cannot decompress the header of the SDU that is split from the lower-layer PDU, and the SDU fails the CRC performed by the header compression layer, the method further comprises:
waiting for an SDU that can be correctly received by an ARQ layer and that has a same context identifier as that of the SDU that cannot be correctly decompressed at the header compression layer, and attempting to decompress the SDU.

11. The method according to claim 7, wherein the interacting with the transmit end to perform header compression comprises:
when a decompressor at a header compression layer of the receive end receives a service data unit (SDU) from an ARQ layer, and the SDU after header decompression fails a cyclic redundancy check (CRC), notifying, by the decompressor at the header compression layer of the receive end, the ARQ layer of the receive end that an error occurs in decompression of the SDU, and instructing, by the ARQ layer of the receive end, the transmit end to perform retransmission.

12. A method according to claim 7, wherein, the header compression is Robust Header Compression (ROHC), and the lower-layer PDU is a PDU at a Media Access Control (MAC) layer.

13. A method for constructing a protocol data processing unit, comprising:
encapsulating, by a protocol data unit (PDU) constructing entity, a service data unit (SDU) into a PDU; and
adding an extended sub-header to the PDU, wherein the extended sub-header comprises header compression information,
wherein, the encapsulating the SDU into the PDU comprises:
packing or fragmenting SDUs with a same context identifier; and
the adding the extended sub-header to the PDU, wherein the extended sub-header comprises the header compression information, comprises:
adding the context identifier to the extended sub-header of the PDU and removing the context identifier from the SDUs.

14. The method according to claim 13, further comprising:
determining, by the PDU constructing entity, whether the SDU has a context information update based on a header format of the SDU; and
identifying an SDU that has the context information update in the extended sub-header.

15. The method according to claim 14, wherein the identifying the SDU that has the context information update in the extended sub-header comprises:
adding, by the PDU constructing entity, a corresponding number of extended sub-headers based on the number of SDUs that have the context information update, wherein, each extended sub-header comprises a first Block Sequence Number (BSN) of an SDU that has the context information update;
or
if an SDU is fragmented and packed to different PDUs for transmission, adding a related extended sub-header to a protocol data processing unit where a first data block of the SDU that has the context information update is located.

16. A method according to claim 13, wherein, the header compression is Robust Header Compression (ROHC), and the lower-layer PDU is a PDU at a Media Access Control (MAC) layer.

17. A method for processing a header compression communication error by using an Auto-Repeat reQuest (ARQ) mechanism, comprising:
performing a cyclic redundancy check (CRC) on a received protocol data unit (PDU);
splitting a PDU that fails the check into service data unit (SDUs), transmitting the SDUs to a header compression layer, and notifying the header compression layer that the SDUs are error data packets; and
if the header compression layer decompresses a header of an SDU that is split from the lower-layer PDU, and the SDU passes the CRC performed by the header compression layer, updating related context information based on correct header information obtained through header decompression.

18. The method according to claim 17, wherein, the header compression is Robust Header Compression (ROHC), and the lower-layer PDU is a PDU at a Media Access Control (MAC) layer.

19. The method according to claim 18, wherein, if the header compression layer cannot decompress the header of the SDU that is split from the lower-layer PDU, and the SDU fails the CRC performed by the header compression layer, the method further comprises: waiting for an SDU that is correctly received by an ARQ layer and that has a same context identifier as that of the SDU that cannot be correctly decompressed at the header compression layer, and attempting to decompress the SDU.

20. The method according to claim 19, wherein a method for determining, by the header compression layer, whether a next SDU that has the same context identifier and that is correctly received by the ARQ layer can be correctly decompressed comprises: in N data packets after the SDU that cannot be decompressed is received, if a case in which an ARQ-layer check is passed but the header compression layer cannot correctly perform decompression does not occur, regarding that a next SDU that has the same context identifier is correctly decompressed by a decompressor at the header compression layer; and in the subsequent N data packets, if the case in which the ARQ-layer check is passed but the header compression layer cannot correctly perform decompression occurs, regarding that the next SDU that has the same context identifier cannot be correctly decompressed by the decompressor at the header compression layer, wherein, N is an integer that is determined through negotiation or manually set when a connection is established.

21. The method according to claim 19, further comprising:
determining, by the decompressor at the header compression layer, whether a received SDU is a retransmitted SDU; and
when determining that the received SDU is a retransmitted SDU, using the retransmitted SDU to decompress a previously buffered SDU that is not correctly decompressed.

22. The method according to claim 21, wherein, the determining, by the decompressor at the header compression layer, whether the received SDU is a retransmitted SDU comprises:
notifying, by the ARQ layer, the header compression layer of whether the received SDU is a retransmitted SDU; or
when the ARQ layer of a receive end uploads each SDU in the received PDU to the decompressor at the header compression layer, notifying the decompressor at the header compression layer of a first Block Sequence Number (BSN) in the SDU;
creating and maintaining, by the decompressor at the header compression layer, a linked table that includes a mapping relationship between context information and a BSN based on a first BSN of each SDU; and
when an SDU arrives at the decompressor at the header compression layer and the decompressor at the header compression layer determines that a first sequence number of the SDU is not larger than a maximum sequence number in the linked table, determining, by the decompressor at the header compression layer, that the SDU is a retransmitted SDU.

23. The method according to claim 21, wherein, the using the retransmitted SDU to decompress a previously buffered SDU that is not correctly decompressed when determining that the received SDU is a retransmitted SDU comprises:
creating a context-identifier-based linked table for storing an SDU that cannot be decompressed and a first Block Sequence Number (BSN);
finding a corresponding storage linked table based on a context identifier of the retransmitted SDU;
according to a BSN of the retransmitted SDU, finding an SDU that is not decompressed and that is stored on the linked table after the BSN; and
according to the retransmitted SDU, updating context information that is buffered in the linked table found based on the context identifier of the retransmitted SDU, and using the context information to decompress an SDU that is stored in the linked table that is not correctly decompressed.

24. A method according to claim 19, further comprising: if the decompressor at the header compression layer cannot correctly decompress a next SDU that is correctly received by the ARQ layer and that has the same context identifier, uploading a subsequent data packet that cannot be correctly decompressed to the decompressor at the header compression layer for continuing to attempt to decompress the SDU; and if the subsequent data packet cannot be correctly decompressed, buffering the subsequent data packet at the header compression layer; and after the subsequent data packet can be correctly decompressed or a retransmitted data packet whose context information is updated arrives, continuing to attempt to decompress the SDU.

25. A method according to claim 19, wherein, if the decompressor at the header compression layer cannot correctly decompress the next SDU that is correctly received by the ARQ layer and that has the same context identifier, when the header compression information that is comprised in the PDU comprises information about whether an SDU that is encapsulated by the PDU has a context information update, the ARQ layer of the receive end determines, according to the information, whether a subsequently received SDU is configured to update the context information in the context identifier, and buffers the subsequent data packet at the ARQ layer until the subsequent data packet is correctly decompressed or a retransmitted data packet whose context information is updated is received.

26. A method for combining header compression feedback and Auto-Repeat request (ARQ) feedback, comprising: a decompressor at a header compression layer of a receive end receives a service data unit (SDU) that is transmitted by an ARQ layer of the receive end and on which header compression is performed and the SDU fails a cyclic redundancy check (CRC) after header decompression, notifying, by the decompressor at the header compression layer of the receive end, the ARQ layer of the receive end of a data decompression error, and instructing, by the ARQ layer of the receive end, a transmit end to perform retransmission by using a feedback mechanism of an ARQ.

27. The method according to claim 26, wherein, the instructing, by the ARQ layer of the receive end, the transmit end to perform retransmission by using the feedback mechanism of the ARQ comprises:
feeding back, by the ARQ layer of the receive end, a specific error form by using at least one bit of bitmap for a first Block Sequence Number (BSN) of each error SDU, wherein the error form comprises at least one of the following: whether the SDU is correctly received, whether header decompression is correct, and whether the Static Context (SC) information or Dynamic Context (DC) information is incorrect.

28. A method for encapsulating a sub-packet in a Hybrid Auto-Repeat request (HARQ) when a header compression mechanism is combined, comprising: receiving a service data unit (SDU) sent by a header compression layer, incapsulating, by a Media Access Control (MAC) layer, the SDU into a protocol data unit (PDU), and sending the PDU to an HARQ layer; and encapsulating, by the HARQ layer, the PDU into a sub-packet, wherein a first SDU in a first PDU with each context identifier in the encapsulated sub-packet is an initialization and state information update packet.

29. The encapsulation method according to claim 28, wherein, an encapsulating procedure of each sub-packet comprises:

notifying, by the MAC layer, the HARQ layer to start to encapsulate a new HARQ-layer sub-packet after receiving an SDU that belongs to an initialization and state information update packet; and receiving, by the HARQ layer, a PDU where a first SDU is the initialization and state information update packet, and starting to encapsulate an HARQ-layer sub-packet from the PDU after receiving the notification of the MAC layer.

30. An apparatus for header compression by using an Auto-Repeat request (ARQ) mechanism, comprising a sending module and a receiving module: the sending module is configured to determine parameters required for performing header compression and an ARQ with the receiving module through negotiation, construct a lower-layer protocol data unit (PDU) that comprises header compression information and send the PDU to the receiving module, and interact with the receiving module to perform header compression processing; and the receiving module is configured to determine the parameters required for performing the header compression and the ARQ with the sending module through negotiation, receive the lower-layer PDU that is sent by the sending module and comprises the header compression information, and interact with the sending module to perform header compression communication.

31. The apparatus according to claim 30, wherein:
the sending module further comprises a header compressing unit and an ARQ sending unit;
the header compressing unit is configured to perform header compression processing on data;
the ARQ sending unit is configured to add an extended sub-header to a lower-layer PDU, include the header compression information in the extended sub-header, and send the lower-layer PDU to the receiving module;
the receiving module further comprises a decompressing unit and an ARQ receiving unit;
the ARQ receiving unit is configured to receive the lower-layer PDU that is sent by the ARQ sending unit and comprises the header compression information, process the lower-layer PDU into a service data unit (SDU), and send the SDU to the decompressing unit; and
the decompressing unit is configured to decompress a received SDU.

32. An apparatus for constructing a protocol data unit (PDU), comprising a header compression information obtaining module and a header compression information adding module: the header compression information obtaining module is configured to obtain header compression information from a service data unit (SDU) whose header is compressed and send the information to the header compression information adding module; and the header compression information adding module is configured to add an extended sub-header to a PDU, and add the header compression information to the extended sub-header.

33. The apparatus according to claim 32, wherein, the header compression information comprises a context identifier of the SDU, or information that indicates whether the SDU has a context information update.

34. An apparatus for processing a header compression error by using an automatic retransmission mechanism, comprising a first checking unit, a splitting unit, a second checking unit, and an updating unit: the first checking unit is configured to perform a cyclic redundancy check (CRC) on a received protocol data unit (PDU); the splitting unit is configured to split a PDU that fails the check into service data units(SDUs), send the SDUs to a header compression layer, and notify the header compression layer that the SDUs may be incorrect; the second checking unit is configured to determine whether a packet header of an SDU be decompressed and whether the SDU passes the CRC performed by the header compression layer; and the updating unit is configured to update related context information based on correct header information that is obtained through packet header decompression when the second checking unit confirms that the packet header of the SDU is decompressed and the SDU passes the CRC performed by the header compression layer.

35. A sub-packet encapsulating apparatus in a Hybrid Auto-Repeat request (HARQ) when a header compression mechanism is combined, comprising a negotiating unit, a counting unit, and an encapsulating unit: the negotiating unit is configured to determine a number N of protocol data units (PDUs) encapsulated in a sub-packet of each HARQ through negotiation before a header compression layer performs compression, wherein N is a number supported by an HARQ layer, a Media Access Control (MAC) layer, and the header compression layer; the counting unit is configured to record the number of PDUs that are sent by the MAC layer to the HARQ layer, wherein when the number reaches N, the counting unit is reset and notifies a compressor at the header compression layer that corresponds to each context identifier on a connection corresponding to an HARQ channel to roll back a state; and the encapsulating unit is configured to start to encapsulate an HARQ sub-packet at the HARQ layer after the MAC layer receives a service data unit (SDU) that belongs to an initialization and state information update packet, wherein a first SDU in a first PDU with each context identifier encapsulated by each sub-packet is an initialization and state information update packet.

36. A method for data packet compression based on a Hybrid Auto-Repeat reQuest (HARQ), comprising:
receiving, by an HARQ layer of a transmit end, a data packet sent from a header compression layer, wherein the data packet comprises at least context information of the data packet of the header compression layer;
encapsulating the data packet of the header compression layer for the data packet to construct an HARQ-layer data packet; and
identifying the HARQ-layer data packet to instruct a receive end to save the context information of the data packet of the header compression layer,
wherein the identifying the HARQ-layer data packet to instruct the receive end to save the context information of the data packet of the header compression layer comprises one of:
adding an extended sub-header to the HARQ-layer data packet, wherein the extended sub-header comprises indication information that instructs the receive end to save the context information of the data packet of the header compression layer in the data packet of the header compression layer; and
when the number of encapsulated data packets at the header compression layer reaches a preset number, increasing a packet number of the HARQ-layer data packet by one, wherein the packet number after being increased by one instructs the receive end to save the context information of the data packet of the header compression layer in the data packet of the header compression layer.

37. The method according to claim 36, wherein, the preset number is a capacity size of a sliding window at the transmit end, and the packet compression layer is a Robust Header Compression (ROHC) layer.

38. A method for data packet decompression based on a Hybrid Auto-Repeat reQuest (HARQ) mechanism, comprising:

receiving, by a header compression layer of a receive end, a data packet and a related packet number from an HARQ layer at the local end, and marking the packet number of the received HARQ-layer data packet as Pn;

querying a list maintained at the local end to obtain context information of a data packet of the header compression layer, where the data packet corresponds to a packet number that is the smallest and most approximate to Pn in the list; and decompressing the received HARQ-layer data packet by using the context information of the data packet of the header compression layer, where the data packet corresponds to the packet number that is the smallest and most approximate to Pn in the list.

39. The method according to claim 38, wherein, before the receiving, by the header compression layer of the receive end, the data packet and the related packet number from the HARQ layer at the local end, the method further comprises:

saving context information Mc of the last data packet of the header compression layer obtained after the HARQ-layer data packet is decompressed; and creating a list that comprises a mapping relationship between the context information Mc of the data packet of the header compression layer and a packet number of the HARQ-layer data packet that encapsulates the context information Mc of the data packet of the header compression layer.

40. The method according to claim 39, comprising: allocating a packet number to an HARQ-layer data packet in the list according to a sequence of time when the data packet arrives at the receive end.

41. The method according to claim 40, wherein, if the HARQ-layer data packet is retransmitted, the packet number that is allocated to the data packet when the HARQ-layer data packet is received at the first time remains unchanged.

42. The method according to claim 38, wherein, the header compression layer is a Robust Header Compression (ROHC) layer.

43. An apparatus for data packet compression based on a Hybrid Auto-Repeat reQuest (HARQ), comprising:

a receiving unit, configured to receive a data packet that is sent from a header compression layer, wherein the data packet of the header compression layer comprises at least context information of the data packet of the header compression layer;

an encapsulating unit, configured to encapsulate the data packet of the header compression layer for the data packet to construct an HARQ-layer data packet; and an identifying unit, configured to identify the HARQ-layer data packet to instruct a receive end to save the context information of the data packet of the header compression layer.

44. An apparatus for data packet decompression based on a Hybrid Auto-Repeat reQuest (HARQ) mechanism, comprising:

a receiving unit, configured to receive a data packet and a related packet number from an HARQ layer of a receive end, and marks the packet number of the received HARQ-layer data packet as Pn;

an obtaining unit, configured to query a list maintained at the local end to obtain context information of a data packet of the header compression layer, where the data packet corresponds to a packet number that is the smallest and most approximate to Pn in the list; and a decompressing unit, configured to decompress the received HARQ-layer data packet by using the context information of the data packet of the header compression layer, where the data packet corresponds to the packet number that is the smallest and most approximate to Pn in the list.

45. The apparatus according to claim 44, further comprising:

a saving unit, configured to save context information Mc of the last data packet of the header compression layer obtained after the HARQ-layer data packet is decompressed; and a list generating unit, configured to create a list that comprises a mapping relationship between the context information Mc of the data packet of the header compression layer and a packet number of the HARQ-layer data packet that encapsulates the context information Mc of the data packet of the header compression layer.

46. The apparatus according to claim 45, further comprising:

a packet number allocating unit, configured to allocate a packet number to an HARQ-layer data packet in the list according to a sequence of time when the data packet arrives at the receive end.

* * * * *